United States Patent
Liu et al.

(10) Patent No.: US 9,825,309 B2
(45) Date of Patent: Nov. 21, 2017

(54) MICROBIAL FUEL CELL AND METHODS OF USE

(71) Applicant: Oregon State University, Corvallis, OR (US)

(72) Inventors: Hong Liu, Corvallis, OR (US); Yanzhen Fan, Corvallis, OR (US)

(73) Assignee: Oregon State University, Corvallis, OR (US)

( * ) Notice: Subject to any disclaimer, the term of this patent is extended or adjusted under 35 U.S.C. 154(b) by 160 days.

(21) Appl. No.: 14/650,251

(22) PCT Filed: Mar. 14, 2014

(86) PCT No.: PCT/US2014/029228
§ 371 (c)(1),
(2) Date: Jun. 5, 2015

(87) PCT Pub. No.: WO2014/144705
PCT Pub. Date: Sep. 18, 2014

(65) Prior Publication Data
US 2015/0349350 A1 Dec. 3, 2015

Related U.S. Application Data

(60) Provisional application No. 61/790,195, filed on Mar. 15, 2013.

(51) Int. Cl.
*H01M 4/96* (2006.01)
*H01M 4/86* (2006.01)
(Continued)

(52) U.S. Cl.
CPC .............. *H01M 4/96* (2013.01); *C02F 3/005* (2013.01); *H01M 4/8652* (2013.01);
(Continued)

(58) Field of Classification Search
CPC .... H01M 4/96; H01M 4/8652; H01M 4/8657; H01M 4/8668; H01M 4/8673;
(Continued)

(56) References Cited

U.S. PATENT DOCUMENTS 5,925,477 A * 7/1999 Ledjeff .................. H01M 6/40
429/465
5,989,741 A * 11/1999 Bloomfield ............... C25B 9/10
156/157
(Continued)

FOREIGN PATENT DOCUMENTS

WO    WO 2011/116266    9/2011

OTHER PUBLICATIONS

Li et al. "Recent advances in separators for microbial fuel cells", Bioresource Technology 102 (2011), pp. 244-252. Available online Apr. 10, 2010.*
(Continued)

*Primary Examiner* — Gregg Cantelmo
(74) *Attorney, Agent, or Firm* — Klarquist Sparkman, LLP

(57) ABSTRACT

Microbial fuel cells capable of generating energy from an organic-based fuel are described. The microbial fuel cells can include an anode component, a cathode component, and a separator component selected to reduce spacing between the anode and the cathode thereby improving performance of the microbial fuel cell. Cathode components including particular components that improve the lifetime, performance, and production of the cathode component at reduced cost also are described, as well as a method of using the microbial fuel cells.

26 Claims, 8 Drawing Sheets

(51) Int. Cl.
- *H01M 8/02* (2016.01)
- *H01M 8/16* (2006.01)
- *H01M 8/24* (2016.01)
- *H01M 8/0243* (2016.01)
- *H01M 8/2455* (2016.01)
- *C02F 3/00* (2006.01)
- *H01M 8/0239* (2016.01)

(52) U.S. Cl.
CPC ....... *H01M 4/8657* (2013.01); *H01M 4/8668* (2013.01); *H01M 4/8673* (2013.01); *H01M 8/0239* (2013.01); *H01M 8/0243* (2013.01); *H01M 8/16* (2013.01); *H01M 8/2455* (2013.01); *H01M 2250/10* (2013.01); *Y02B 90/14* (2013.01); *Y02E 60/527* (2013.01); *Y02P 70/56* (2015.11)

(58) Field of Classification Search
CPC .... H01M 8/0239; H01M 8/0243; H01M 8/16; H01M 8/2455; C02F 3/005; Y02P 70/56; Y02B 90/14; Y02E 60/527
See application file for complete search history.

(56) References Cited

U.S. PATENT DOCUMENTS

| | | | |
|---|---|---|---|
| 7,452,920 B2* | 11/2008 | Lin | H01B 1/24 204/524 |
| 2002/0025469 A1 | 2/2002 | Heller | |
| 2004/0151962 A1* | 8/2004 | Adams | H01M 8/04186 429/443 |
| 2008/0292912 A1* | 11/2008 | Logan | H01M 4/8878 429/2 |
| 2010/0162619 A1 | 7/2010 | Peus | |
| 2010/0304226 A1 | 12/2010 | Keller et al. | |
| 2011/0305970 A1 | 12/2011 | Sahai et al. | |
| 2012/0321966 A1 | 12/2012 | Wallin et al. | |

OTHER PUBLICATIONS

Ghasemi et al. "Activated carbon nanofibers as an alternative cathode catalyst to platinum in a two-chamber microbial fuel cell", International Journal of Hydrogen Energy 36 (2011), pp. 13746-13752. Available online Sep. 1, 2011.*

Antolini et al., "Carbon supports for low-temperature fuel cell catalysts," *Applied Catalysis,* 88(1-2): 1-24, Apr. 29, 2009.

Cheng et al., "Increased performance of single-chamber microbial fuel cells using an improved cathode structure," *Electrochemistry Communications,* 8(3): 489-494, Feb. 20, 2006.

Fan et al., "Enhanced Coulombic efficiency and power density of air-cathode microbial fuel cells with an improved cell configuration," *Journal of Power Sources* 171(2): 348-354, Jul. 3, 2007.

Supplementary Partial European Search Report issued in European Application No. EP 14762945.5 dated Feb. 4, 2016, 11 pages.

Zhang et al. "The use of nylon and glass fiber filter separators with different pore sizes in air-cathode single-chamber microbial fuel cells," *Energy & Environmental Science,* 3: 659-664, Mar. 22, 2010. Retrieved from the Internet on Aug. 21, 2014, at URL <http://www.engr.psu.edu/ce/enve/logan/publications/2010-Zhang-etal-EnergyEnvSci.pdf> (6 pages).

International Search Report and Written Opinion from International Application No. PCT/US2014/029228, dated Sep. 15, 2014 (10 pages).

* cited by examiner

MICROBIAL FUEL CELL AND METHODS OF USE

CROSS REFERENCE TO RELATED APPLICATIONS

This application is the U.S. National Stage of International Application No. PCT/US2014/029228, filed Mar. 14, 2014, which was published in English under PCT Article 21(2), which in turn claims the benefit of the earlier filing date of U.S. Provisional Application No. 61/790,195 filed on Mar. 15, 2013, each of which is herein incorporated by reference in its entirety.

ACKNOWLEDGMENT OF GOVERNMENT SUPPORT

This invention was made with government support under CBET0955124 and IIP1265144 awarded by NSF—National Science Foundation. The government has certain rights in the invention.

FIELD

The present disclosure concerns a microbial fuel cell and a method of using the fuel cell also are disclosed herein.

BACKGROUND

The finite reserves of fossil fuels and ever-increasing pressure on reducing greenhouse gas emission have generated an urgent need for alternative sources of energy. Wastewater treatment accounts for about 3% of electrical energy consumed in the U.S. and other developed countries. Wastewater is estimated to contain as much as 9.3 times the amount of energy currently consumed to treat the water in a modern wastewater treatment plant. Microbial fuel cell (MFC) technology, which uses microorganisms to catalyze the direct generation of electricity from biodegradable organic matter, provides a completely new approach for energy generation from wastewater while simultaneously treating wastewater. MFC technology holds great promise in converting wastewater treatment from an energy consuming process to a net energy producing process, thus drastically enhancing energy sustainability for wastewater treatment and reuse.

A single chamber air-cathode microbial fuel cell (MFC) provides great advantages over a two chamber system for many practical applications because 1) passive air can be used thus no aeration is needed, 2) no recycle or chemical regeneration of catholyte is required, thus the operation is simplified, and 3) smaller cell volume, thus higher volumetric power density, is easily achieved. Furthermore, air-cathode MFCs that lack a proton exchange membrane (PEM) hold great promise due to their low cost, simple configuration, and relatively high power density. Membrane-free MFCs, however, present two major challenges: (1) coulombic efficiency is much lower than that of MFCs containing a membrane when a mixed culture is used due to the consumption of substrate by oxygen diffused through the cathode; and (2) the anode and cathode distance in a membrane-free MFC is limited to a certain range (about 1-2 cm) due to the potential negative effect of oxygen on the activity of the anaerobic bacteria on the anode and the risk of short circuit. This relatively large electrode spacing not only increases the internal resistance, but also limits the volumetric power density.

Another limitation of traditional MFCs is that the voltage output of a single MFC is normally less than 0.8 V, and often less than 0.3 V at maximum power output. Such a low voltage output greatly limits the application of MFCs. In traditional methods, voltage output is increased by serially connecting several MFCs together with a conductor or current collector. However, these serial connections often lead to problems, such as voltage reversal and voltage crossover, which greatly reduce the overall performance of the MFC stack. Another solution used in the art is to use DC/DC converter to boost voltage. However, such methods not only increase the complexity, and thus lower the reliability, of a MFC stack, but also reduce the overall efficiency as a significant portion of energy is lost during the conversion process. Furthermore, a current collector is still needed for large MFC stacks, which not only increases the total cost and size of an MFC stack, but also decreases the reliability and lifetime of the MFC.

SUMMARY

Disclosed herein are embodiments of a microbial fuel cell, comprising an anode component, a cathode component, and a separator component configured to reduce internal resistance and resist biodegradation. The anode component and the cathode component are associated with the separator component and may be in direct contact, or associated through another component, with the separator component.

The separator component is a woven or non-woven fabric comprising hydrophilic fibers, hydrophobic fibers, or combinations thereof. The hydrophilic fibers typically are selected from polypropylene, rayon, viscose, acetate, cotton, nylon, and combinations thereof. The hydrophobic fibers typically are selected from polyester, acrylic, modacrylic, and combinations thereof. In particular disclosed embodiments, the fabric comprises the hydrophobic material makes up about 1% to about 100% of the fabric, such as about 1% to about 90%, or about 1% to about 80%, or about 1% to about 70%. In other disclosed embodiments, fabric comprises polypropylene. In particular disclosed embodiments, the fabric comprises blended polyester and acetate, rayon, or cotton.

The separator component may be configured to reduce internal resistance by providing one or more openings within the separator component to allow gas to pass through the separator component.

The cathode component comprises a catalyst, which, in particular disclosed embodiments, is activated carbon powder. The cathode component may further comprise a binder. The binder is configured to be sufficiently hydrophilic so as to provide improved proton transport and sufficiently hydrophobic so as to provide improved air/oxygen transport. In particular disclosed embodiments, the hydrophilic binder comprises one or more functional groups selected from a hydroxyl group, an amino group, a thiol group, and combinations thereof. Certain embodiments concern a hydrophilic binder that is a carbohydrate selected from a saccharide, a disaccharide, or a polysaccharide, a mucopolysaccharide, and combinations thereof. Exemplary embodiments of the binder are selected from hydrophilic components, such as chitosan, a chitosan derivative, glucosamine, a glucosamine derivative; hydrophobic polytetrafluoroethylene (PTFE) and polydimethylsiloxane (PDMS); and combinations thereof.

The cathode component may further comprise a catalyst-enhancing reagent. The catalyst-enhancing reagent is selected to improve electric conductivity and reduce ohmic loss of the cathode component. In particular disclosed embodiments, the catalyst-enhancing reagent is carbon black and/or graphite powder. In additional disclosed embodiments, the cathode component comprises a base material. The base material is a gas diffusion layer, and may be selected from carbon paper, carbon cloth, stainless steel cloth, stainless steel mesh, and combinations thereof. In yet other embodiments, the cathode component may further comprise a coating material, such as polytetrafluoroethylene, a polydimethylsiloxane compound (alone or combined with a curing agent), or combinations thereof.

In particular disclosed embodiments, the catalyst and the catalytic-enhancing reagent are used in combination as a composition. The composition may comprise about 50% to about 99% of the catalyst and about 1% to about 50% of the catalyst-enhancing reagent. In some embodiments, the composition comprises about 60% to about 99%, about 70% to about 99%, about 80% to about 99%, or about 90% to about 99% of the catalyst and about 1% to about 40%, about 1% to about 30%, about 1% to about 20%, or about 1% to about 10% of the catalyst-enhancing reagent.

The microbial fuel cell may comprise one or more wires. The one or more wires are electrically conductive and typically are titanium wires. The microbial fuel cell also may comprise one or more endplates, and in particular disclosed embodiments, it comprises at least one inlet and outlet. The microbial fuel cell may be connected in a serial or parallel orientation with one or more additional microbial fuel cells as provided herein.

Also disclosed herein is a serially connected microbial fuel cell system, comprising two or more electrically connected segments of a base material configured to act as an anode component and a cathode component, a separator component, and wherein the base material and separator components are configured to convert an organic-based fuel to energy without a current collector component or a converter component. The two or more electrically connected segments of the base material are provided by allowing physical overlap between two different segments of a base material. In particular disclosed embodiments, the two or more electrically connected segments of the base material comprise different base material components. Each of the different base material components are selected from carbon paper, carbon cloth, stainless steel cloth, stainless steel mesh, and combinations thereof. In yet other embodiments, a single continuous sheet of the base material is used to provide the two or more electrically connected segments of the base material and a portion of the base material acts as the anode component and a separate portion of the base material acts as the cathode component. In such embodiments, the single continuous sheet of the base material is carbon cloth, carbon paper, or combinations thereof. In particular disclosed embodiments, being configured to act as a cathode component comprises treating a segment of the base material with a catalyst, a binder, a catalyst-enhancing reagent, or combinations thereof.

Also disclosed herein is a cathode component comprising a base material, a coating, a catalyst, and a binder that is configured to be sufficiently hydrophilic so as to provide improved proton transport, and sufficiently hydrophobic so as to provide improved oxygen transport, as disclosed herein. In particular disclosed embodiments, the catalyst and the binder are applied as a layer over the base material coated with the coating material. The layer of the catalyst and the binder is dried using a method other than heating (e.g., drying with air or an inert gas, such as by allowing the components to be exposed to air/inert gas atmosphere, or affirmatively flowing air/inert gas over the components) in particular embodiments. The catalyst may be pre-treated with phosphoric acid or nitric acid. In particular disclosed embodiments, the catalyst may be treated with $FeCl_3$, $CoCl_2$, EDTA, EDA, cyanamide, or combinations thereof. The hydrophilic binder may be functionalized, such as with a cross-linking reagent selected from glutaraldehyde, poly (ethylene glycol), citric acid glyoxal, epichlorohydrin, and combinations thereof.

The present disclosure also concerns method for producing energy, comprising providing the microbial fuel cell disclosed herein, introducing an organic-based fuel into the microbial fuel cell, and isolating energy from the organic-based fuel. In particular disclosed embodiments, the organic-based fuel is selected from wastewater, organic-based fluid, and combinations thereof. The wastewater may be generated from food or beverage processing, or from a municipal source.

In particular disclosed embodiments, the organic-based fuel is introduced into the microbial fuel cell through an inlet of the microbial fuel cell. The electrons and protons from the organic-based fuel may be separated and isolated from the fuel and pass to a cathode component of the microbial fuel cell either through a wire component or through a separator component wherein the electrons and protons are recombined to form water. In particular disclosed embodiments, the method may be performed at atmospheric pressure, or under increased pressure in order to maintain any $CO_2$ generated therein in a liquid state. The method also may further comprise monitoring the performance of the microbial fuel cell by determining the power density provided by the microbial fuel cell and improving the performance of the microbial fuel cell by adjusting one or more operational conditions. In particular disclosed embodiments, the act of adjusting one or more operational conditions comprises increasing the oxygen concentration within the microbial fuel cell by administering pressurized air into the microbial fuel cell. In other embodiments, the act of adjusting one or more operational conditions comprises adjusting the temperature of the microbial fuel cell. The act of adjusting the temperature also may comprise operating the microbial fuel cell at a temperature between about 4° C. to about 100° C., or between about 25° C. to about 80° C. In additional embodiments, the act of adjusting one or more operational conditions comprises adjusting the pH conditions of the microbial fuel cell. The pH may be adjusted to emulate basic conditions with a pH ranging from about 7 to about 14, such as about 7 to about 13, about 7 to about 12, about 7 to about 11, or about 7 to about 10. In other embodiments, the pH may be adjusted to emulate acidic conditions with a pH ranging from about 1 to about 7, about 2 to about 7, about 3 to about 7, or about 4 to about 7.

The foregoing and other objects, features, and advantages of the invention will become more apparent from the following detailed description, which proceeds with reference to the accompanying figures.

DETAILED DESCRIPTION

I. Introduction

Figure 1:
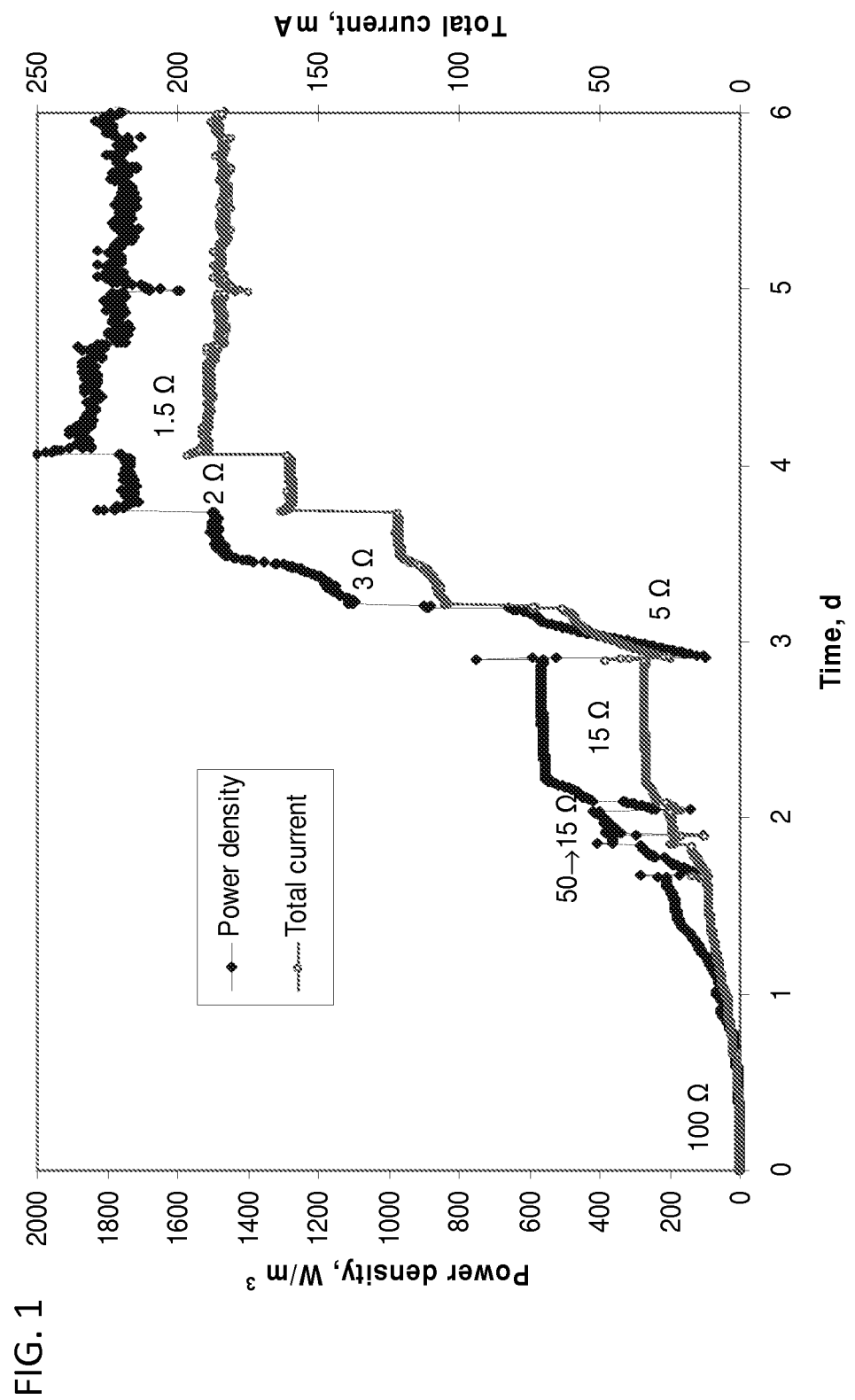
FIG. 1 is a graph illustrating the power densities (solid squares) and total current (open circles) readings obtained from a particular embodiment of the microbial fuel cell (MFC) disclosed herein.

The following description is exemplary in nature and is not intended to limit the scope, applicability, or configuration of the invention in any way. Various changes to the described embodiment may be made in the function and arrangement of the elements described herein without departing from the scope of the invention. Further, descriptions and disclosures provided in association with one particular embodiment are not limited to that embodiment, and may be applied to any embodiment disclosed.

As used in this application and in the claims, the singular forms "a," "an," and "the" include the plural forms unless the context clearly dictates otherwise. Additionally, the term "includes" means "comprises." Further, the terms "coupled" and "associated" generally mean electrically, electromagnetically, and/or physically (e.g., mechanically or chemically) coupled or linked and does not exclude the presence of intermediate elements between the coupled or associated items absent specific contrary language.

Although the operations of exemplary embodiments of the disclosed method may be described in a particular, sequential order for convenient presentation, it should be understood that disclosed embodiments can encompass an order of operations other than the particular, sequential order disclosed, unless the context dictates otherwise. For example, operations described sequentially may in some cases be rearranged or performed concurrently. Further, descriptions and disclosures provided in association with one particular embodiment are not limited to that embodiment, and may be applied to any embodiment disclosed.

CE: Coulombic efficiency.
CEA: Cloth electrode assembly.
COD: Chemical oxygen demand.
MFC: Microbial fuel cell.
PAC: Activated carbon powder.
PD: Power density.

II. Microbial Fuel Cell

Disclosed herein are embodiments of a microbial fuel cell (MFC) for converting organic-based fuel to energy. In particular disclosed embodiments, the microbial fuel cell is a microbial fuel cell suitable for directly producing electricity from organic-based fuel. The microbial fuel cell comprises one or more components that contribute to its ability to convert an organic-based fuel to electricity.

One disclosed embodiment of a microbial fuel cell comprises a separator component suitable for separating anode and cathode components, suitable for providing the ability to reduce the distance between these two components. Reducing the distance between these components decreases the internal resistance and enhances the power and volumetric power density produced by the microbial fuel cell. In the field of microbial fuel cells, the cathode is widely considered as the key factor limiting air-cathode MFC performance, even when platinum is used as a catalyst. However, the membrane and/or electrolyte often contribute most to the internal resistance. For example, an electrolyte can contribute about 78.2% of the internal resistance for a common air cathode, single-chamber MFC (1.7 cm anode-cathode spacing, 50 mM phosphate buffer). In comparison, the cathode and the anode only contribute 19.5% and 2.2%, respectively. An effective way to enhance the performance of this kind of MFC is to reduce the electrolyte resistance, which can be achieved by reducing the anode-cathode spacing and/or increasing the pH buffer concentration.

Reducing electrode spacing (e.g., anode-cathode spacing) can proportionally decrease the area-specific electrolyte resistance and in turn the internal resistance, thus enhancing the performance of MFCs. Moreover, reducing electrode spacing can increase the ratio of the electrode surface area/volume and, in turn, the maximum volumetric power density. However, the potential for short circuit and/or increased oxygen diffusion often limits the minimum electrode spacing of membrane-less MFCs to about 1-2 cm, which is still too large to keep the electrolyte resistance low. Membrane electrode assembly (MEA), which is a sandwich structure used in PEM fuel cells, can effectively minimize the electrode spacing and enhance MFC performance in comparison with other designs. However, the inclusion of a cation exchange membrane (CEM), such as Nafion 117, can be disadvantageous given its high area-specific resistance under neutral pH conditions, which could be about 3000 $\Omega cm^2$ and contribute 38-86% of the total internal resistances of two-chamber MFCs. The major reason for the high resistance of the CEM in an MFC is the neutral pH condition, or extremely low proton concentration. CEMs block the diffusion of proton carriers (phosphate and/or bicarbonate), resulting in a high cross-membrane pH gradient and resistance. The disclosed separator component provides the ability to overcome many of these issues.

In particular disclosed embodiments, the separator component may provide the ability for a fast microbial fuel cell start up. The separator component also may provide the ability to provide high power density, high coulombic efficiency, and high energy efficiency.

The power density provided by embodiments of a microbial fuel cell comprising the disclosed separator component ranges from about 2 $W\,m^{-2}$ to about 6 $W\,m^{-2}$; typically from about 1 $W\,m^{-2}$ to about 5 $W\,m^{-2}$; even more typically from about 2 $W\,m^{-2}$ to about 4.5 $W\,m^{-2}$. In exemplary embodiments, the maximum power density was about 4.3 $W\,m^{-2}$.

In certain embodiments, the microbial fuel cell comprising the disclosed separator component can provide a coulombic efficiency ranging from about 10% to about 100%; more typically from about 50% to about 100%; even more typically from about 60% to about 100%. In exemplary embodiments, the microbial fuel cell produced a coulombic efficiency of about 74% to about 98%.

The separator material also provides the microbial fuel cell with the ability to achieve energy efficiency at maximum power ranging from about 5% to about 40%; more typically from about 15% to about 35%; even more typically the energy efficiency is greater than 21%.

In particular disclosed embodiments, the separator component is a fabric material. The fabric material may be a woven or non-woven, porous fabric comprising one or more openings suitable for releasing by-products made when using the microbial fuel cell. For example, the non-woven fabric may comprise one or more openings that allow gases, such as $CO_2$ and $CH_4$, produced between the anode and cathode components to be released. These openings provide the ability to prevent the space between the anode and the cathode components from increasing and thereby reducing microbial fuel cell performance. In particular disclosed embodiments, the openings may be in the form of linear slots that may be singular slots or that may intersect at one or more points (e.g., to form an "+"). When in the form of a linear slot, each opening may have a size sufficient to allow gas to pass through. In particular disclosed embodiments, the openings may have a size ranging from about 0.5 cm to about 3 cm; such as about 0.5 cm to about 2.5 cm; about 0.5 cm to about 2 cm; from about 0.5 cm to about 1 cm. Exemplary embodiments concern one or more 1 cm×1 cm slots. In particular disclosed embodiments, the openings may be round and in the form of a circle, oval, or other similar shape. The round openings may have a diameter ranging from about 0.1 to about 1 cm, such as about 0.1 cm to about 0.75 cm, or about 0.1 cm to about 0.6 cm, or about 0.1 cm to about 0.5 cm, or about 0.1 cm to about 0.4 cm. In particular disclosed embodiments, the round openings are circular and have a diameter of about 0.3 cm.

The disclosed fabric may comprise hydrophilic and/or hydrophobic fibers, polymers, and the like. In particular disclosed embodiments, the fabric is made substantially from hydrophilic fibers; however, it is a feature of the present disclosure that the fabric not degrade too quickly as high performance and long-term stability are desirable characteristics. It is known in the art that biodegradable fabric materials, such as J-cloth, degrade over time and therefore are not suitable by themselves for forming a durable separator. Accordingly, the fabric typically is not made solely from biodegradable materials, and disclosed separator components are durable and do not degrade over time (e.g., durable for more than about 1 year to about 10 years).

In particular disclosed embodiments, the fabric may comprise a mixture of hydrophilic and hydrophobic materials. Hydrophilic materials include, but are not limited to, polypropylene, rayon, viscose, acetate, cotton, nylon, and the like. Hydrophobic materials include, but are not limited to, polyester, acrylic, modacrylic, and the like. The fabric component may comprise one or more of these different materials in any suitable amount. In particular disclosed embodiments, the fabric component comprises a hydrophobic material in an amount ranging from 1% to about 100% of the fabric components, such as about 1% to about 90%, or about 1% to about 80%, or about 1% to about 70%. The fabric component may further comprise one or more different hydrophobic or hydrophilic materials in an amount ranging from about 99% to less than about 1%. Exemplary embodiments concern a fabric component comprising 100% polypropylene, or a fabric component comprising blended polyester and acetate, rayon, or cotton.

In particular disclosed embodiments, the fabric component may be configured to have a thickness that allows for suitable separation of the anode and the cathode components. For example, the fabric component may have a thickness ranging from about 0.01 mm to about 10 mm; more typically from about 0.1 mm to about 5 mm; even more typically from about 0.1 mm to about 1 mm; even more typically from about 0.1 mm to about 0.5 mm. Exemplary embodiments concern a fabric component having a thickness of about 0.3 mm. The fabric component may comprise a single layer, or multiple layers of the fabric material. If multiple layers are used, then those layers, together, have the thicknesses stated herein.

The separator component may be placed in between the anode and cathode components in any position suitable to maintain separation. Any suitable means for attaching the separator component either to the anode, cathode, or both components, may be used. In particular disclosed embodiments, the separator component is attached to the anode or the cathode using a method suitable for holding the components together, such as using a glue material, and sewing or weaving the anode or cathode together with the separator component. The glue material may be applied to a portion, or the entirety of the separator component, and may be applied to one side or both sides of the separator component. In particular disclosed embodiments, the anode may be a carbon cloth, as disclosed herein, and may therefore be physically joined with the separator component by methods such as sewing and or weaving the components together.

The anode component of the microbial fuel cell may comprise a biofilm. The biofilm may be a layer that substantially covers the anode component, and may comprise bacteria (or microbes) capable of transferring electrons from matter to other components. In particular embodiments, the biofilm may comprise bacterial components in particular ratios that promote the ability of the biofilm to produce a high current. The biofilm may be applied to the anode using methods known in the art, such as either by manually applying microbes or bacteria to the anode, or initiating microbe or bacterial growth, or by allowing an organic-based fuel to pass over an anode component and thereby promote bacteria accumulation on the anode component.

Traditional biofilms function under anaerobic conditions; however, the biofilm disclosed herein is tolerant of oxygen, as evidenced by FIG. 1. As illustrated in FIG. 1, the performance of an embodiment of the disclosed microbial fuel cell was not significantly affected by directly pumping air (e.g., at a speed of 20 ml min$^{-1}$) into the microbial fuel cell. FIG. 1 further illustrates that the power density for disclosed embodiments resumes quickly after the air pump is stopped.

The ability to increase oxygen levels in the microbial fuel cell, as a result of using an oxygen-tolerate biofilm may inhibit methanogenesis, sulfate reduction, and hydrogenesis. In exemplary embodiments using the disclosed microbial fuel cell, no methane or hydrogen gas was detected during a period of operation lasting approximately 63 days.

Both the anode component and the cathode component disclosed herein may be constructed using any suitable electrically conductive material. The material for the anode typically is selected to promote growth and adherence of bacteria. The anode and/or the cathode components may be made from, or coated with, conductive metals selected from, but not limited to, silver, gold, stainless steel, titanium, cobalt, tungsten, and alloys thereof. The anode and/or cathode components may comprise conductive polymers or conductive carbon. Additionally, the anode and/or cathode components may be layered, containing regions of the same or different materials disclosed herein. Any suitable number of anode and cathode components may be used in the disclosed microbial fuel cell. In particular disclosed embodiments, the number of anodes and cathodes are equivalent, but the present disclosure is not limited to such embodiments. For example, one anode and more than one cathode may be used, or more than one anode and one cathode may be used.

In particular disclosed embodiments, the cathode is made of a base material, such as those disclosed herein, and may comprise a catalyst. Platinum catalysts used in fuel cells are known in the art; however, these catalysts are expensive and therefore contribute to the overall high cost of traditional fuel cell costs. Disclosed catalysts illustrate high catalytic activity for the oxygen reduction reactions that occur within the microbial fuel cell. The catalyst may be used in combination with other components, such as a binder, a base material, a coating material, and one or more catalytic-enhancing reagents. In particular disclosed embodiments, the catalyst is a material selected to comprise small particles and have high conductivity. For example, the catalyst may comprise particles having an average diameter ranging from about 0.01 mm to about 0.5 mm; more typically from about 0.05 mm to about 0.4 mm; more typically from about 0.1 mm to about 0.25 mm. Exemplary embodiments of the catalyst include activated carbon powder, which may include graphite powder, or may be made from bamboo wood, coal, hard wood, or coconut. In some embodiments, the activated carbon powder is made from bamboo.

The catalyst may be further treated in order to improve its performance. In particular disclosed embodiments, the catalyst may be treated with an acid in order to reduce ash content. In exemplary embodiments, the catalyst is treated with phosphoric acid. In other embodiments, the catalyst may be treated with an acid to improve hydrophilicity. For example, nitric acid may be used to treat the catalyst and provide a more hydrophilic catalyst. In additional embodiments, the catalyst may be treated with an appropriate reagent to introduce additional elements that enhance the catalyst's ability to promote oxygen-reduction reactions. For example, elements like Fe, Co, and nitrogen may be added to the catalyst by exposing and/or treating the catalyst with reagents selected from nitric acid, $FeCl_3$, $CoCl_2$, EDTA, EDA, cyanamide, and combinations thereof. In exemplary embodiments, the catalyst is activated carbon treated with concentrated nitric acid; activated carbon treated with Fe/Co EDTA; activated carbon treated with Fe/Co EDA; activated carbon treated with $FeCl_3$ and cyanamide; or activated carbon treated with $CoCl_2$ and cyanamide.

The binder is added to bind the catalyst, but also may be a reagent capable of enhancing the performance of the cathode. For example, the binder may be a compound comprising one or more functional groups that contribute to the binder's hydrophilicity and ion exchange capacity. Suitable binders may be non-ionic to facilitate charge transfer and stabilize performance in neutral pH conditions that typically are used in microbial fuel cells. Also, the hydrophilic nature of the binder enhances the cathode's electrochemical response, and thereby increases the power density.

Solely by way of example, the binder may comprise one or more functional groups selected from a hydroxyl group, an amino group, a thiol group, or combinations thereof. In particular disclosed embodiments, the binder is sufficiently hydrophilic so as to provide improved proton transport. In particular disclosed embodiments, the binder may be selected from a carbohydrate, such as a saccharide, a disaccharide, or a polysaccharide, or a mucopolysaccharide. Exemplary binder embodiments include, but are not limited to, chitosan, glucosamine, and combinations and derivatives thereof. In other disclosed embodiments, the binder may be any of the coating material disclosed herein. In such embodiments, the binder may be selected from chitosan, PTFE, PDMS, and combinations thereof.

The binder may be cross-linked in order to reduce crystallinity, thereby enhancing the cathode's performance and stability. For example, the binder may be cross-linked with one or more cross-linking agents suitable for coupling with functional groups, such as any amine- and/or hydroxyl-reactive compound. Exemplary cross-linking reagents include, but are not limited to glutaraldehyde, poly(ethylene glycol), citric acid glyoxal, epichlorohydrin, and combinations thereof.

The catalyst may be combined with components in addition to the binder. One component is a base material. The base material typically may be selected from any material suitable for acting as a gas diffusion layer, such as carbon paper, carbon cloth, stainless steel cloth, stainless steel mesh, or combinations thereof. In particular disclosed embodiments, the base material may be suitable for use as an anode and/or cathode component itself. For example, in embodiments wherein one or more of the microbial fuel cells are serially connected, the base material to serve as both the anode and/or cathode components.

Also disclosed herein is a coating material, which may be used to encapsulate any combination of the catalyst, the binder, the base material, and the catalyst-enhancing reagent. In particular disclosed embodiments, the coating material is a water-proofing coating. Exemplary coating materials include polytetrafluoroethylene (PTFE), a polymeric siloxane compound (e.g., polydimethylsiloxane (PDMS), which may be used alone or in combination with a curing agent), or combinations thereof as a coating material. In some embodiments, the coating material is water-proofing coating comprising PDMS (alone or combined with a curing agent); such coating materials can be cured at for ambient temperatures or temperatures above ambient temperature, such as temperatures ranging from about 30° C. to about 200° C. (e.g., about 50° C. to about 180° C., or about 100° C. to about 170° C.). PDMS embodiments are useful alternatives where more than two coatings of the PTFE are required to hold a high water pressure (e.g., 2 meter water pressure) and further include curing or sintering the coatings at high temperatures (e.g., such as greater than about 200° C. to about 400° C.).

Figure 2:
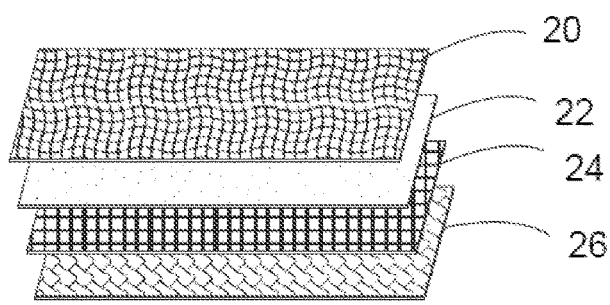
FIG. 2 is an exploded perspective view of a particular arrangement of the disclosed microbial fuel cell components.

Coating materials comprising a PDMS compound can also be mixed with catalyst-enhancing agents to form a conductive, water-proofing, air-breathing base layer for the catalyst. The mixing ratio can be about 1:10 to about 10:1. In embodiments using such coating materials, the device need not comprise a carbon cloth base layer. In yet other embodiments, these coating materials may be used with stainless steel mesh or a cloth layer, such as polypropylene non-woven cloth, to enhance the conductivity and/or physical strength of the coating. FIG. 2 illustrates an embodiment of how the layered features of the various components for a microbial fuel cell can be combined. The disclosed device may comprise a catalyst layer (20), a conductive coating comprising a coating material (22), an optional stainless steel mesh (24), and an optional cloth layer (26). These components can be arranged in any suitable arrangement, including combining the catalyst layer (20) with the conductive coating (22); combining the catalyst layer (20) with the conductive coating (22) and the stainless steel mesh (24); combining the catalyst layer (20) with the conductive coating (22) and the cloth layer (26); or combining all four components in the order illustrated in FIG. 2.

In some embodiments, the coating material comprises a polymeric siloxane compound, which may be combined with a curing agent mixed in the ratio of 5:1 to 100:1 measured by weight. Exemplary polymeric siloxanes typically can comprise at least 60% dimethyl siloxane (dimethylvinyl-terminated), from about 30% to about 60% dimethylvinylated and trimethylated silica, and about 1% to about 5% tetra(trimethylsiloxy) silane; at least 60% dimethyl siloxane (dimethylvinyl-terminated) and from about 30% to about 60% dimethylvinylated and trimethylated silica; or combinations thereof. Exemplary curing agents include, but are not limited to, about 40-70% dimethyl, methylhydrogen siloxanes; about 15-40% dimethyl siloxane, (dimethylvinyl terminated); about 10-30% dimethylvinylated and trimethylated silica; about 1-5% tetramethyl tetravinyl cyclotetra siloxanes; or combinations thereof An exemplary coating material is Dow Corning Sylgard 184 Silicone, Sylgard 527, and the like. Different coating materials also can be mixed together to achieve better oxygen permeability. Solely by way of example, Dow Corning Sylgard 184 and Sylgard 527 can blended in a ratio from 10:1 to 1:10 to provide a mixed coating material to provide increased strength, oxygen permeability, and increased water pressure tolerance than unmixed embodiments.

The coating material can be cured at room temperature for a suitable period (e.g., at least 2 to about 24 hours) or it can be cured at temperatures above room temperature for a shorter time period using a suitable condensation system. In some embodiments, a Sn-based cure system and/or a room temperature vulcanizing (RTV) system can be used. In these embodiments, an alkoxy crosslinker can be exposed to ambient humidity or water thereby facilitating hydrolysis of the alkoxy group to provide a hydroxyl group. This hydroxyl group can then condense with a hydroxyl group of the silicone polymer.

The coating material may be applied to the base material, followed by addition of the catalyst and binder. In particular disclosed embodiments, the binder and the catalyst may be applied to the base material, which may or may not be covered with the coating material. Heat may be used to join these components, or the components may be joined without heat.

The catalyst-enhancing reagent is used to improve catalyst properties. For example, the catalyst-enhancing reagent is selected to improve electric conductivity, and thereby reduce cathode ohmic loss. Particular disclosed embodiments of the catalyst-enhancing reagent include carbon black and/or graphite powder. In particular disclosed embodiments, the catalyst and the catalytic-enhancing reagent are used in combination as a composition. For example, the composition may comprise from about 50% to about 100% of the catalyst, such as about 50%, about 60%, about 70%, about 80%, about 90%, about 95%, or about 99%; and the catalyst-enhancing reagent can make up about 1% to about 50% of the composition, such as about 1%, about 5%, about 10%, about 20%, about 30%, about 40%, or about 50%.

The disclosed separator component may be combined with any one or more of the components disclosed herein. For example, the separator component may be joined with a layer comprising the catalyst and the binder during cathode fabrication. The separator component may be joined to a layer of the catalyst using the binder reagent.

The disclosed microbial fuel cell also may comprise one or more end plates, one or more wires, and one or more inlet/outlet components. The end plates typically are plastic end plates suitable for holding the multiple components together. Wires disclosed herein may act as current collectors, create a larger contact area, and possibly reduce internal resistance. The wires typically are comprised of a material that is capable of collecting current produced from the anode/cathode components of the microbial fuel cell. In particular disclosed embodiments, the wires are titanium wires that may be formed into any suitable shape such as to provide increased surface area contact with the anode and/or cathode components and to reduce the maximum distance between the wire and any point on the anode and/or cathode components. Exemplary embodiments concern using U-shaped titanium wires. The inlet/outlet components typically are configured to allow input and/or output of an organic-based fuel to pass through the microbial fuel cell (see FIG. 3, which illustrates inlets 30 and outlets 32).

III. Microbial Fuel Cell Assembly

Figure 3:
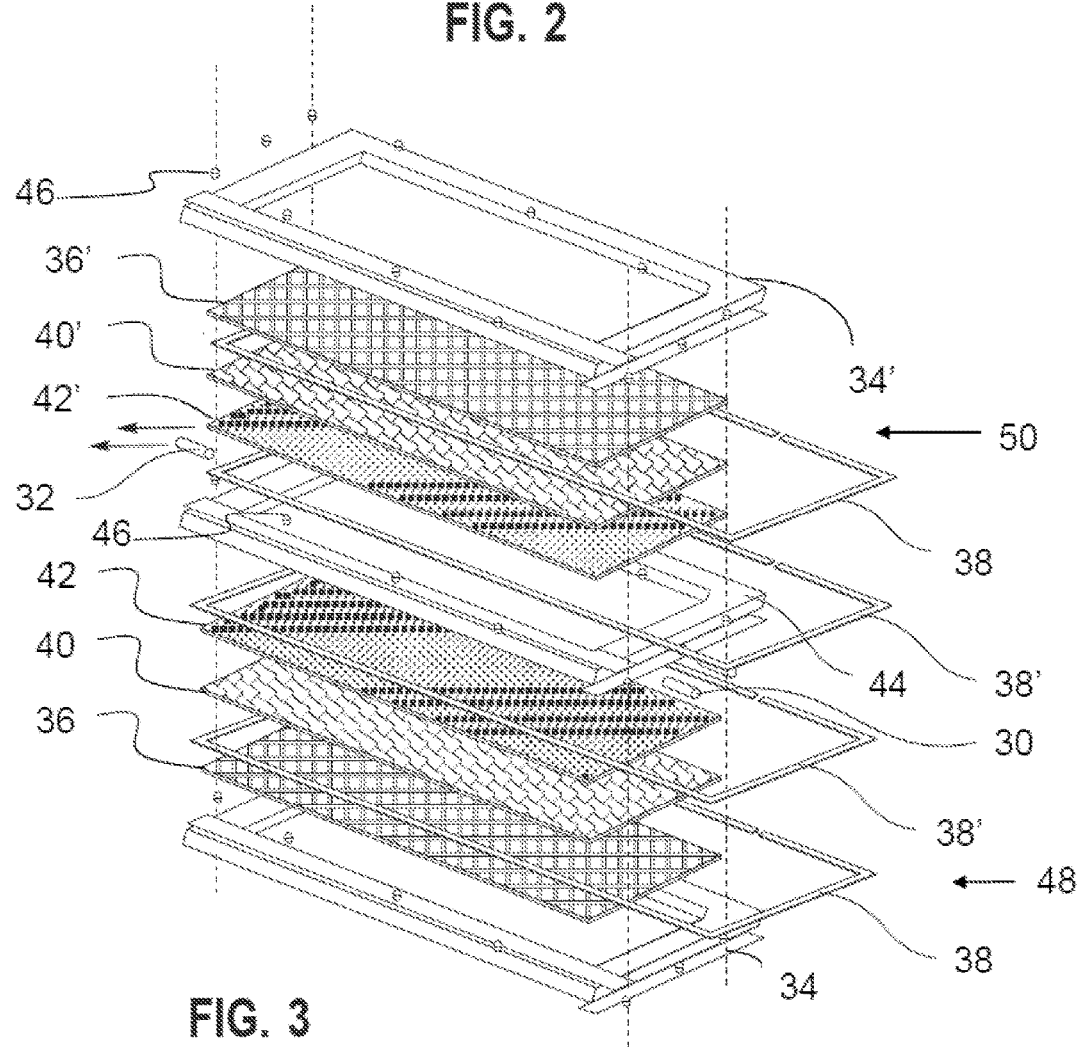
FIG. 3 is an exploded perspective view of a particular embodiment of the disclosed microbial fuel cell comprising various components and their assembly.

The microbial fuel cell comprises at least one distinct electrode assembly comprising an anode component, a cathode component, two endplates, one or more inlets/outlets, two wires, and at least one separator component disclosed herein. FIG. 3 illustrates a particular embodiment wherein multiple electrode assemblies are combined; however, it is contemplated herein that a single electrode assembly may also be used. With reference to FIG. 3, a first endplate (34) forms the bottom of the microbial fuel cell and the cathode component (36) is placed onto the first endplate. A first titanium wire (38), used as a current collector for the cathode, is electrically associated with the cathode. The separator component (40) is placed over the first titanium wire and also makes contact with the cathode component (36). The anode component (42) is placed on top of the separator component (40) and is in direct contact with the separator component. A second titanium wire (38'), suitable for collecting current from the anode (42), is then electrically associated with the anode. Finally, a second endplate (44) is placed on top of the components. Endplates 44 and 34 may comprise one or more fastener apertures (not shown)

to receive a fastener (46) to hold the components together. In particular disclosed embodiments, at least one of the endplates comprises one or more inlet or outlet components.

The separator component (40) and/or anode component (42) may be modified to comprise one or more openings suitable for releasing biogas produced between the anode and the cathode (36). This modification step may include any means suitable for introducing openings in the separator component, such as cutting slits, punching holes, and the like. In particular disclosed embodiments, openings having the dimensions provided herein are preferred given the increased ability to release more biogas and thereby improve performance. The modification step may occur before the anode is added, or after complete assembly.

In particular disclosed embodiments, the microbial fuel cell may comprise two or more electrode assemblies. FIG. 3 illustrates a particular embodiment wherein two electrode assemblies, as disclosed herein, are combined to provide an embodiment of the microbial fuel cell. When two or more electrode assemblies are used, the particular order of components may be modified in order to allow the components of the microbial fuel cell to interact appropriately. A first electrode assembly may be made in the manner described above, whereas a second electrode assembly is made in a substantially reverse order. For example, a first electrode assembly is made, and the second electrode assembly is constructed in a continuous fashion with the first electrode assembly. Solely by way of example, a second endplate (44) of the first electrode assembly (48) illustrated in FIG. 3 is used as a base for a second electrode assembly (50). A wire (38') capable of collecting current from an anode component is placed on top of the second endplate of the first electrode assembly, followed by a second anode component (42'), thus making two anode components within the entire assembly. A second separator component (40') is then placed on top of the second anode component (42') and makes direct contact with the second anode component. Another wire (38) is placed in electrical contact with the separator component (40') to collect current from the cathode component (36). A second cathode component (36') is added, followed by an additional endplate (34'), which then completes the particular layers of a microbial fuel cell comprising two electrode assemblies.

Figure 4:
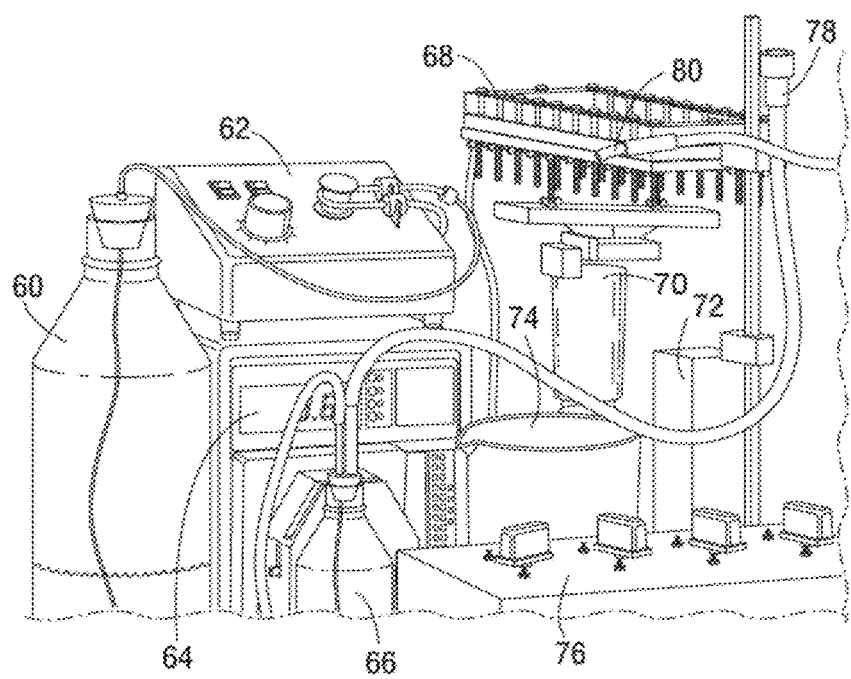
FIG. 4 is an illustration of a particular MFC set-up used for testing an embodiment of the disclosed microbial fuel cell.

FIG. 4 further illustrates other components that may be used in combination with the microbial fuel cell in order to obtain energy from an organic-based fuel. According to FIG. 4, additional components may be selected from a feed reservoir (60), a feed pump (62), a recirculation pump (optional) (64), a recirculation reservoir (66), a microbial fuel cell (68), a tilt angle adjusting device (70) for the microbial fuel cell, an outlet level control device (72), a effluent reservoir (74), a precision resistor box (76), a gas sampling port (78), and an effluent outlet (80).

Scale-up is an important issue for practical application of MFCs, especially in the field of wastewater treatment. Maintaining performance during scale-up has proven to be challenging for methods that currently exist in the art. The volumes of most air-cathode MFCs known in the art are relatively small yet produce a high power density. Large-scale air cathode MFCs are known wherein the liquid volume ranges from 1 to 20 liters, or 2-4 orders of magnitude larger than the milliliter-scale MFC; however, the maximum power densities of these liter-scale MFCs are 2-4 orders of magnitude lower than the mL-scale versions. Accordingly, merely increasing reactor size from milliliter-scale to liter-scale does not necessarily lead to a significant increase in total power output; however, particular embodiments of the microbial fuel cell disclosed herein may be large-scale and increase total power and current output.

In particular disclosed embodiments, the microbial fuel cell apparatus may be assembled on a small-scale (based on liquid volume) or on a large-scale (based on liquid volume). For example, small-scale assembly may be suitable for embodiments wherein low volumes of liquid are used (e.g., milliliter scale, such as from about 0.1 mL to about 900 mL; more typically from about 1 mL to about 500 mL; even more typically from about 1 mL to about 250 mL). In a large-scale assembly, larger volumes of liquid may be used (e.g., liter scale, such as from about 1 L to about 100 L; more typically from about 1 L to about 75 L; even more typically from about 1 L to about 50 L). In particular disclosed embodiment, the microbial fuel cell may be a large-scale microbial fuel cell that also is capable of producing increased power output, such as about 86 mW to about 100 mW, which can be maintained for 1-24 hours, 1 to 7 days, or longer periods of time.

In particular disclosed embodiment, one or more microbial fuel cells may be serially connected in order to increase overall voltage output. Traditional methods for increasing voltage output from MFCs include serially-connecting several MFCs together using a conductor or current collector, or using a DC/DC converter to boost voltage. These methods, however, not only lead to increased complexity and/or cost, but can lead to problems like voltage reversal and/or voltage cross-over, and reduced overall efficiency. The microbial fuel cell disclosed herein is serially associated without a current collector and does not require a DC/DC converter to boost voltage, thereby avoiding these issues.

When the microbial fuel cell is serially associated, it may comprise the following set-up. Solely by way of example, one portion (e.g., one side) of a base material segment is treated with the reagents disclosed herein (e.g., catalyst, binding agent, catalyst-enhancing reagents, and combinations thereof). This particular combination provides a material that is used as a cathode, wherein the portion (e.g., one side) of the base material that is left uncoated can act as an anode. Alternatively, the anode and cathode components may be made from the different base materials disclosed herein, with particular embodiments using base materials selected from carbon cloth, stainless steel cloth or mesh, and combinations thereof. These components are electrically associated together, such as by physical association or overlap of a portion of each component, and/or by providing a continuous sheet of the base material, which serves as both anode and cathode base material components. Two or more of these particular segments are made and oriented so that the separator component is capable of being placed between the anode portion of one segment and the cathode portion of another segment. The segments and separator components are positioned to form serially connected electrode assemblies in a particular orientation, such as a linear orientation.

Figure 5:
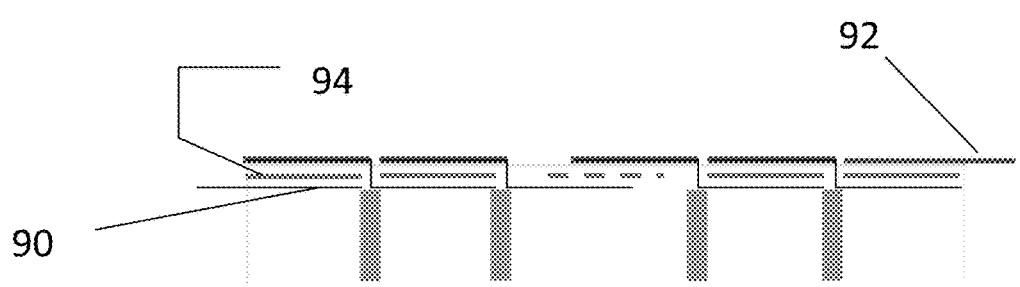
FIG. 5 is a schematic diagram of an embodiment of a serially connected microbial fuel cell disclosed herein.

FIG. 5, which illustrates serially-connected electrode assemblies. As illustrated in FIG. 5, multiple anode portions (90) and cathode (92) portions having a separator component (94) are provided. These components are serially associated without a current collector in a compact fashion. In particular disclosed embodiments, two serially connected CEAs, each with 3 individual CEAs, were placed in between three identical 1 cm thick PVC frames with 3 openings (4 cm×20 cm) to form a five-layer sandwich structure with 3 channels (4 cm×20 cm×1 cm).

IV. Methods of Using the Microbial Fuel Cell

In particular disclosed embodiments, the microbial fuel cell is used to generate energy from an organic-based fuel.

The disclosed microbial fuel cell may be used in a variety of different situations and/or conditions to provide energy where traditional energy sources are lacking or are undesirable.

Particular disclosed embodiments concern a method of producing energy, comprising providing the microbial fuel cell disclosed herein, introducing an organic-based fuel into the microbial fuel cell, and producing/isolating energy from the organic-based fuel. The method may further comprise one or more pretreatment and/or post treatment steps. Pretreatment may include screening, equalization, neutralization, sedimentation, hydrolysis, digestion, and combinations thereof. Post treatment may include using secondary sedimentation, filtration, adsorption, disinfection, and certain post treatment components that can be used include activated sludge, a biofilm reactor, a membrane bioreactor, surface-aerated basins, constructed wetlands, and combinations thereof.

In particular disclosed embodiments, the disclosed microbial fuel cell is suitable for converting wastewater into energy. For example, the energy needs for a typical domestic wastewater treatment plant employing aerobic activated sludge treatment and anaerobic sludge digestion is 0.6 kWh $m^{-3}$, about half of which is for electrical energy to supply air for the aeration basins. With air-cathode MFCs using passive aeration, the energy need can be reduced to 0.3 kWh $m^{-3}$, assuming the same energy is required for other processes. The energy content in a typical 500 mg COD $l^{-1}$ domestic wastewater has been estimated to be 1.93 kWh $m^{-3}$, of which 1.23 kWh $m^{-3}$ is biodegradable. A net energy of 0.07 kWh $m^{-3}$ could be produced with air-cathode MFCs, assuming 30% of the biodegradable COD in domestic wastewater can be converted to electricity. Much higher net energy may be produced from high strength industrial wastewater, especially food or beverage processing wastewater.

In additional disclosed embodiments, the microbial fuel cell may be used to produce energy from a suitable organic-based fluid, thereby providing an effective and efficient means for providing energy in conditions where a traditional energy source is not available. Solely by way of the example, the disclosed microbial fuel cell may be used to produce energy in environments where electricity is scarce or in states of emergency when electricity is not available.

Disclosed herein are various conditions and operational features for using the disclosed microbial fuel cell to obtain energy from organic-based fuel. Embodiments concerning methods of making energy from organic-based fuel may be performed in batch-mode or continuous mode.

In particular disclosed embodiments, the microbial fuel cell may be operated at a temperature suitable for long-term use and energy efficiency. For example, the microbial fuel cell can be operated at temperatures ranging from about 4° C. to about 100° C. In particular disclosed embodiments, the microbial fuel cell is operated at a temperature ranging from about 25° C. to about 35° C. The performance also may be improved by raising the temperature, such as by increasing the temperature to greater than about 35° C. to about 100° C., greater than about 50° C. to about 100° C., and greater than about 70° C. to about 100° C.

Also, the disclosed fuel cell may be operated under particular pH conditions, the pH being controlled by buffering conditions within the fuel cell. For example, the pH of a buffer used in the microbial fuel cell may be altered in order to affect performance. The pH may be adjusted to emulate basic conditions with a pH ranging from about 7 to about 14, such as about 7 to about 13, about 7 to about 12, about 7 to about 11, or about 7 to about 10. In other embodiments, the pH may be adjusted to emulate acidic conditions with a pH ranging from about 1 to about 7, about 2 to about 7, about 3 to about 7, or about 4 to about 7. In particular disclosed embodiments, the pH may be adjusted with the pressure of the reactor. For example, the pH may be adjusted from neutral pH to a pH of about 7 to about 9 at atmospheric pressure, and a pH of about 4 to about 7 at increased pressure.

In one embodiment, the microbial fuel cell is operated at atmospheric pressure. In other embodiments, the microbial fuel cell may be operated at an increased pressure sufficient to maintain any $CO_2$ produced in the microbial fuel cell in a liquid state. In embodiments wherein the $CO_2$ is maintained as a liquid, performance may be enhanced by either eliminating $CO_2$ gas produced by the microbial fuel cell and/or allowing the liquid $CO_2$ (in the form of aqueous $CO_2$, carbonate, bicarbonate, and carbonic acid) to act as a pH buffer and proton carrier. In other disclosed embodiments, operating the microbial fuel cell at increased pressure can provide the ability to increase buffer concentration used in the fuel cell. In particular disclosed embodiments, the pressure of the microbial fuel cell ranges from about 1 atm to about 1000 atm, more typically from about 1 atm to about 100 atm, and even more typically from about 1 atm to about 10 atm.

The microbial fuel cell disclosed herein also may be operated under conditions wherein an oxidant is used. In particular disclosed embodiments, the oxidant may be air or oxygen. For example, pressurized air may be used in the disclosed microbial fuel cell in order to increase oxygen partial pressure thereby enhancing the concentration of oxygen.

The microbial fuel cell disclosed herein may be operated in continuous flow mode. In particular disclosed embodiments, microbial fuel cells can be operated in fed-batch mode, in which the biofilm is exposed to air when the liquid in microbial fuel cells is discharged. The periodical exposure to air inhibits the growth of methanogens in the biofilms.

In particular disclosed embodiments, the method may comprise using one microbial fuel cell. In other disclosed embodiments, the method may comprise using two or more microbial fuel cells, which may be used separately or may be connected in a serial or parallel orientation. When two or more microbial fuel cells are used, each may be used to process the same sample of organic-based fuel, or each may be used to process different samples of organic-based fuel.

Figure 6:
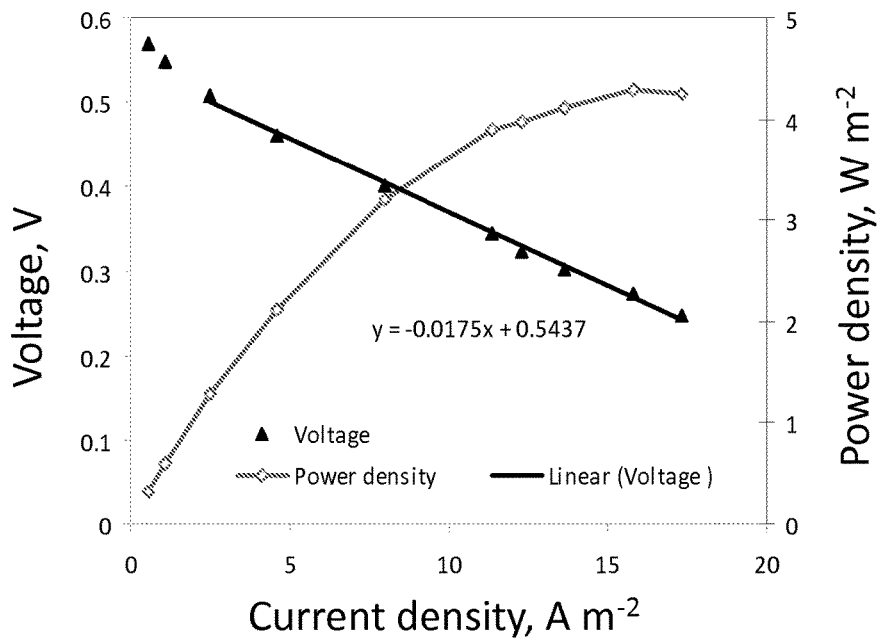
FIG. 6 is a graph illustrating a polarization curve obtained from data produced by a particular embodiment of the disclosed microbial fuel cell. Voltage values are indicated with a solid triangle, and power density values are indicated with an open circle. Also illustrated within the graph is a linear fitting indicating the portions of the polarization curve used for calculating internal resistance.

The ability of the disclosed microbial fuel cell to exhibit high performance in its ability to extract energy from an organic-based fuel is a significant advancement in MFC technology. In particular disclosed embodiments, a possible maximum power density may be produced that is higher than that produced in anaerobic digestion. In particular disclosed embodiments, the microbial fuel cell's energy efficiency can be significantly increased if the MFC is operated at a higher voltage. For example, the energy efficiency can be increased to about 30% if the MFC is operated at about 0.4 V, or about 35% at about 0.46 V. According to polarization curves obtained from certain embodiments of the microbial fuel cell (FIG. 6), power densities of about 2.13 kW $m^{-3}$ at 0.4 V and about 1.41 kW $m^{-3}$ at 0.46 V may be obtained, which are still much higher than that of anaerobic digestion.

In addition to producing higher power at comparable energy efficiency, the microbial fuel cell disclosed herein exhibits particular advantages over anaerobic digestion based on its combination of components and the ability to generate electricity directly. The removal of $H_2S$ from the biogas produced from methanogenesis to prevent combustion-associated byproducts is expensive and energy intensive. Additional energy may be needed to strip $CH_4$ from the effluent to prevent the dissolved $CH_4$ from escaping into the atmosphere. The oxygen-tolerant biofilm disclosed herein allows the microbial fuel cell to operate at high anodic oxygen levels, which not only substantially eliminates $H_2S$ and $CH_4$ production, but also diversifies pollutant degradation pathways, thus making the disclosed microbial fuel cell more effective at pollution removal than anaerobic processes.

In particular disclosed embodiments, the type of organic-based fuel that is used can affect the amount of energy produced by the microbial fuel cell. In particular disclosed embodiments, wastewater is used and in certain embodiments, higher net energy may be produced from high strength industrial wastewater, such as food or beverage processing wastewater. In particular disclosed embodiments, the organic-based fuel may be an organic-containing substance from which energy may be obtained.

Particular embodiments of the disclosed microbial fuel cell are capable of producing current densities up to about 20 $A\ m^{-2}$, which are considerably higher than the equivalent current densities of most biofilm-based processes, including aerobic heterotrophic biofilms (1.6-2.8 $A\ m^{-3}$) and methanogenic biofilms (0.5-9.5 $A\ m^{-2}$). The higher current density demonstrates the competitive advantage and great potential of microbial electrochemical technology, particularly the disclosed microbial fuel cell. The higher current density indicates higher COD removal rate for wastewater treatment. Solely by way of example, a current density of about 16.4 $A\ m^{-2}$ (10.9 $kA\ m^{-3}$) can be translated to a conversion rate of 78.1 kg COD $m^{-3}\ d^{-1}$ to current, or a total of 93.5 kg $m^{-3}\ d^{-1}$ COD removal rate assuming the CE is 83.5%, which is almost 3 times higher than the 25 kg COD $m^{-3}\ d^{-1}$ of an anaerobic digester, demonstrating the high efficiency of disclosed MFCs in pollution removal.

A major challenge of commercial application of MFC technology in wastewater treatment is the high capital cost, especially material cost of anodes, cathodes, and separators. However, as disclosed herein, low-cost, high-performance cathode, anode and separator components provide similar if not better output for the microbial fuel cell.

V. Working Embodiments

Design and Construction of the Large CEA-MFC:

A single chamber air-cathode MFC with a double CEA was constructed by placing a non-woven fabric layer (Armo Style #6000) between the carbon cloth anode (CCP, fuelcellearth.com) and the carbon cloth/Pt/PTFE cathode (20% of Pt/C catalyst; E-TEK, USA) to form a CEA. U-shape Ti wires were used as the anode and cathode current collectors in both CEAs. The two CEAs (CEA1 and CEA2) were placed between three identical 0.6 cm thick acrylic frames with 5 cm×20 cm openings to form a five-layer sandwich structure, with CEA1 at the top and CEA2 at the bottom of the reactor initially. Three 1 cm by 1 cm crosses were cut through the anode and cloth layers of CEA1, evenly distributed along the long axis, to release possible biogas produced between the anode and cathode. Alternatively, for CEA2, three holes 00.3 cm were punched through the two layers to vent biogas. The reactor had a liquid volume of 30 ml and a total effective surface area of 200 $cm^2$. FIGS. 2 and 3 illustrate assembly schematics for a double CEA-MFC.

CEA-MFC Operation:

The MFC was inoculated with a mixed bacterial culture from the anode of an air cathode MFC, which was originally inoculated with domestic wastewater from the Corvallis Wastewater Treatment Plant (Corvallis, Oreg.) and was operated for more than 3 years using acetate. Unless otherwise specified, acetate (100 mM) was used as the substrate, and the medium solution contained the following (per liter): $NH_4Cl$, 1.5 g; KCl, 0.13 g; $NaH_2PO_4 \cdot H_2O$, 5.84 g; $Na_2HPO_4 \cdot 7H_2O$, 15.5 g; and mineral (12.5 ml) and vitamin (12.5 ml) solutions disclosed by Lovley et al. (the mineral solutions disclosed by Lovley et al. can comprise $Na_2MoO_4$, $NiCl_2 \cdot 6H_2O$, and combinations thereof, and the vitamin solutions can comprise B-vitamins). The MFC experiments were operated at 32±1° C. in a temperature-controlled chamber.

The double CEA-MFC was inclined at an angle of 5° with CEA-1 on the top and CEA-2 at the bottom initially. Batch mode was initially employed and the system was switched to the continuous flow mode after two days as the power output started to increase significantly. Then the CEA-MFCs were continuously fed wastewater at a flow rate of 0.4 ml $min^{-1}$ maintained through a peristaltic pump, corresponding to a hydraulic retention time (HRT) of 1.2 hours. The medium solution in a 2000 ml reservoir was autoclaved before being fed to the MFC at the lower end of the reactor. A portion of the effluent was recirculated back to the influent with another peristaltic pump at a flow rate of 20 ml $min^{-1}$ to achieve a more even distribution of the medium solution. A 50 ml reservoir was included in the recirculation line to collect the possible gas produced in the MFC.

The MFC was considered to be started-up when the voltage output stabilized within about a week. Once start-up was achieved, the effects of water pressure (from the 2nd to the 4th week), HRT (from the 5th week to the 6th week), and recirculation (the $6^{th}$ week) were investigated. Water pressure was controlled by finely adjusting the level of the silicone tube outlet via a screw driver mechanism. The effluent water level was adjusted from −4 cm to +4 cm in the following sequence: 0 cm, +1 cm, −1 cm, +2 cm, −4 cm, +4 cm, −2 cm, 0 cm, before the reactor was flipped to study the difference between the top CEA and the bottom CEA. The various HRTs (0.37-3.4 hours) were adjusted by varying the flow rate from 0.15 to 1.3 ml $min^{-1}$, with the actual flow rate calculated based on daily medium consumption. The effect of recirculation on MFC performance was investigated by adding or removing the 50 ml recirculation reservoir. From the 7th week, the effect of phosphate buffer concentration (0.05 M, 0.1 M and 0.2 M) on MFC performance was investigated. The flow rate and acetate concentration were also varied to study the effect of self-produced bicarbonate on MFC performance. The recirculation reservoir was removed during this analysis.

Analysis:

Both CEAs of the MFC were separately connected to a precision decade resistance box with a resolution and minimum resistance of 0.1) (602 N, General Radio). Voltage (V) was recorded, using a multichannel data acquisition system (2700, Keithly, USA), and used to calculate the volumetric power density, based on the liquid reactor volume (30 ml), and surface power density, based on the projected surface area of the electrode (100 $cm^2$ for each CEA and 200 $cm^2$ for the reactor). The contact and wiring resistances (about 0.06Ω) were considered in the calculation of current (I) and calculated by measuring both voltages over the resistance box terminals and over the current collector (Ti wire) terminals. For the preparation of polarization curves, the MFC was first stabilized for about 30 minutes at 10 kΩ. The external resistances of both CEAs were then simultaneously reduced with a typical sequence of 100, 50, 20, 10, 5, 3, 2.4, 2, 1.6, 1.4, 1.2, and 1.0Ω to reduce the voltage to about 0.2 V. At each resistance, MFCs ran for about 20 minutes to ensure that a stable power output had been achieved. It took approximately 4 hours of operation to finish a polarization curve. The internal resistance of each CEA, $R_{int}$, was calculated from the linear parts of the I-V polarization curves. Area specific resistances ($\Omega cm^2$) were also calculated, by multiplying the internal resistance ($\Omega$) by the projected electrode area ($cm^2$), for comparison with other studies.

Acetate concentrations in both influent and effluent were analyzed with an Agilent 1000 series high performance liquid chromatograph (Agilent Technologies, Santa Clara, Calif.) equipped with an RID detector and an Aminex HPX-87H column (Bio-Rad Laboratories, Hercules, Calif.). A solution of 5 mM per liter $H_2SO_4$ was used as the running buffer at a flow rate of 0.6 ml $min^{-1}$. Coulombic efficiency (CE) was calculated based on the ratio of the average current, one hour before taking acetate samples, and the theoretical current, calculated based on the amount of acetate removed. When there was noticeable biogas production, indicated by the gas buildup in the recirculation reservoir, 100 ml of gas was withdrawn, using a syringe, from the gas sampling port located at the outlet of the reactor. The gas sample was immediately injected into a gas chromatograph (Agilent 6890; J&W Scientific, USA) for the analysis of gas composition. The GC was equipped with a thermal conductivity detector and a column (113-3133 CARBON-PLT, 30 m×0.32 mm×3 µm, J&W Scientific, USA) with argon as the carrier gas.

Start-Up Results:

Several strategies had been applied initially to ensure start-up including autoclaving the medium solution to remove oxygen, a shorter HRT (4 minutes) to ensure lower oxygen level in the reactor, and the use of 2 layers of J-cloth to reduce oxygen diffusion. However, the start-up of a particular embodiment of the disclosed microbial fuel cell, such as a large CEA-MFC, was faster and easier, despite the much thinner, single non-woven cloth layer (about 0.3 mm) and much longer HRT (>75 minutes). As demonstrated by FIG. 1, in less than 5 days the MFC generated a stable high power density of 1.8 kW $m^{-3}$. This power density was much higher than the 1.01 kW $m^{-3}$ and 1.55 kW $m^{-3}$ generated by smaller CEA-MFCs containing 100 mM phosphate buffer and 200 mM bicarbonate buffer, respectively.

Figure 7:
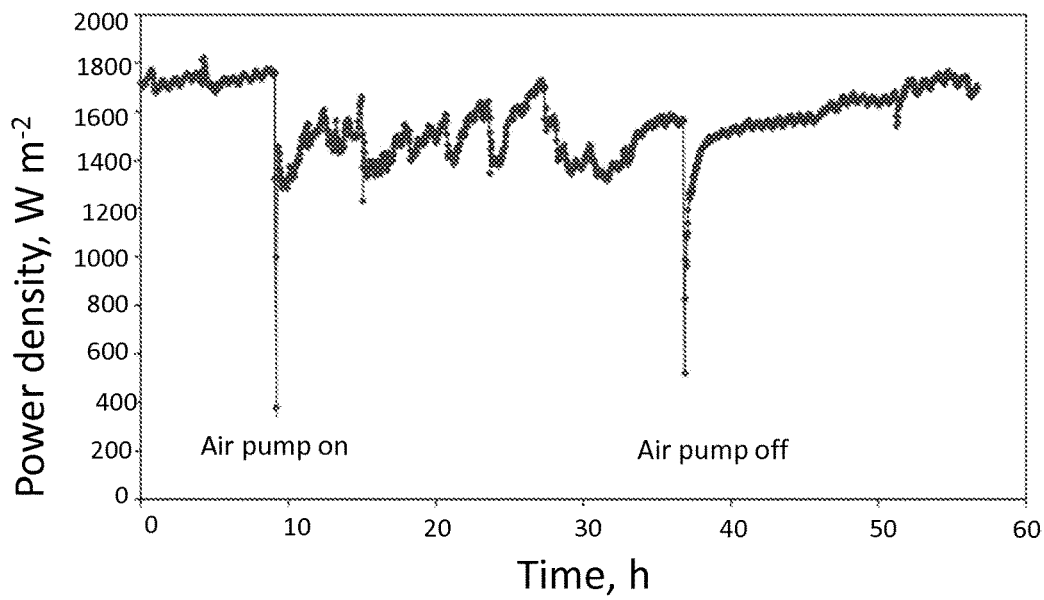
FIG. 7 is a graph illustrating results obtained from testing oxygen tolerance of an anodic biofilm disclosed herein.

The surprisingly faster and easier start-up, in the large double CEA-MFC with thinner separators, suggests that the anodic biofilm may be able to tolerate high levels of dissolved oxygen. To investigate oxygen tolerance of the exoelectrogens at the anode, oxygen was directly pumped into the MFC chamber between the two anodes at a speed of 20 ml $min^{-1}$ through the recirculation tube for more than a day. The power density decreased from ~1700 W $m^{-3}$ to ~1400 to 1600 W $m^{-3}$ after pumping the air into the MFC and recovered in about a day after the air pump was stopped (FIG. 7). The fluctuation in power generation was possibly due to the much faster air flow (20 ml $min^{-1}$) than liquid flow (0.4 ml $min^{-1}$), which might affect the substrate availability to the anodes, especially to the anode at the top of the reactor. This result confirms that the mixed bacterial culture can tolerate high levels of oxygen in water and even direct contact with air. This was possibly due to the continuous evolution of oxygen tolerant exoelectrogens under high oxygen levels for several years. The high oxygen level in the double CEA MFC may help to inhibit methanogenesis, sulfate reduction, and hydrogenesis, as no $CH_4$ or $H_2$ production was detected during the 63-day operation and $CO_2$ was the only biogas produced.

Power Density Results:

The power density of CEA1 reached a maximum of 4.30 W $m^{-2}$ (16.4 A $m^{-2}$) at an HRT of 1.37 h (FIG. 1), which was more than double the 1.8 W $m^{-2}$ produced in the small MFC with J-cloth as separator. The high performance of the double CEA-MFC is important for the potential application of MFC technology. The possible maximum power density of 2.87 kW $m^{-3}$ is more than two-times higher than the power of 1.1 kW $m^{-3}$ that can be produced in anaerobic digestion, a commercialized wastewater treatment process, based on a conversion rate of 25 kg COD $m^{-3}d^{-1}$ and an overall energy efficiency of 30%.

Figure 8:
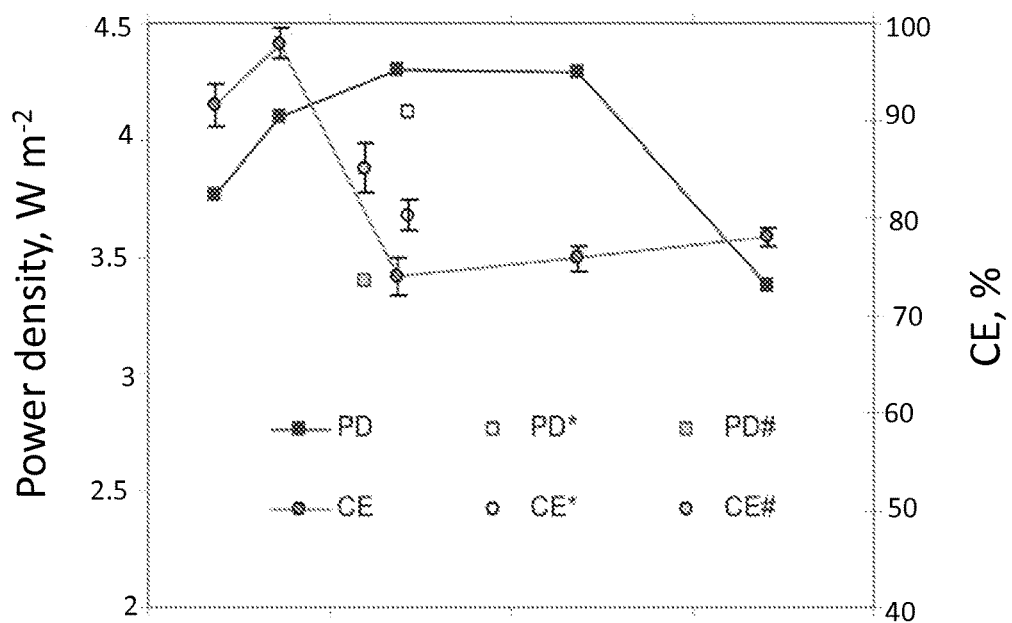
FIG. 8 is a graph of data illustrating the effects of hydraulic retention time on power density and coulombic efficiency.
Figure 9:
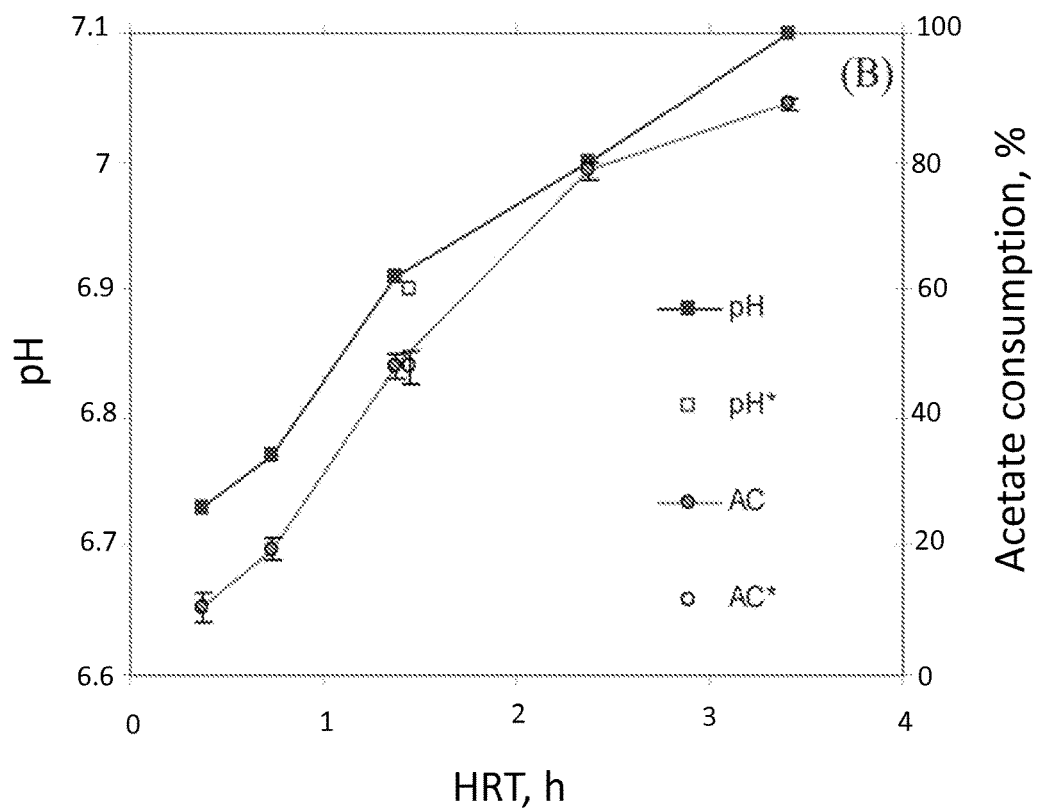
FIG. 9 is a graph of data illustrating the effects of hydraulic retention time on and pH and acetate consumption.

Power densities were over 4 W $m^{-2}$ with HRT in the range of 0.7-2.4 hours, but decreased considerably outside this range (FIGS. 7 and 8). The high current densities contributed to the high CE, which was in the range of 74-98% at the tested HRTs (FIG. 8). The removal of the recirculation reservoir increased the CE from 74% to 80% while slightly decreasing the power density by 4%. The complete removal of recirculation significantly decreased the power density by 21%, although the CE was further improved to 85%. These results demonstrate that recirculation may be a factor in enhancing the mass transport of substrate to the electrode. On the other hand, oxygen diffusion and other non-current-generating processes might be affected by recirculation as well, resulting in a slightly lower CE. Increased HRT resulted in increased acetate consumption, as expected (FIG. 9). Increased HRT also resulted in higher effluent pH, indicating higher $CO_2$ release at longer HRTs (FIG. 9). The absence of recirculation slightly decreased the effluent pH and acetate removal, probably due to the reduction in power density and current density (FIGS. 8 and 9).

Coulombic and Energy Efficiency Results:

The coulombic efficiencies of the MFCs are in the range of 74-98% at the tested conditions, which are considerably higher than some other MFCs (Table 2). Based on a voltage efficiency of 25% and CE of 83.5%, the energy efficiency of the MFC at maximum power was only 21%, which is lower than that of anaerobic digestion (28-30%). The energy efficiency, however, can be significantly increased if the MFC had been operated at a higher voltage. For example, the energy efficiency can be increased to a comparable 30% if the MFC had been operated at 0.4 V, or 35% at 0.46 V. According to the polarization curves (FIG. 6), the power densities of 2.13 kW $m^{-3}$ at 0.4 V and 1.41 kW $m^{-3}$ at 0.46 V were still much higher than that of anaerobic digestion.

A side effect of a thinner separator and reduced electrode spacing is increased oxygen crossover, which may lead to the growth of oxygen-consuming heterotrophs. Although the exoelectrogens can still out-compete the other heterotrophs, as demonstrated by the fast MFC start-up (FIG. 1) and high oxygen tolerance of anodic biofilms (FIG. 7), the higher oxygen crossover may lead to decreased CEs. However, the high CEs (83.5±10.6%) achieved in the embodiments disclosed herein indicated otherwise. Without being limited to a particular theory of operation, it is currently believed that these high CEs observed using the embodiments disclosed herein are due to the high current density achieved in the CEA-MFC. The maximum oxygen flux through a 0.3 mm thick water layer at 30° C. is 1.2 mmol m$^{-2}$ S$^{-1}$ based on Fick's Law, or an equivalent current density of 0.42 A m$^{-2}$, assuming no oxygen at the anode and the effective diffusion coefficient in non-woven fabric is 60% of that in water. This is only 2.5% of the current density (16.4 A m$^{-2}$) at which maximum power density was produced in this study and 2% of the maximum proton flux (20 A m$^{-2}$ equivalent) via 0.1 M phosphate buffer under the same assumption. The oxygen flux can be even lower if the oxygen level at the anode is not zero, which reduces the concentration difference across the separator. Although the actual oxygen level might be higher due to biofilm development at the cathode and the porous separator, a CE of over 95% can be expected if oxygen is the only sink of noncurrent-generating substrate consumption. The relatively lower actual CEs (83.5±10.6%) in this study indicated that the substrate consumption in the recirculation line and for biomass synthesis should also be considered. Nevertheless, high CEs are possible even with a low mass transfer resistance separator as thin as 0.3 mm. Therefore, oxygen crossover should not be a major concern in the selection of separator materials if the anodic biofilm is oxygen tolerant and the current density is greater than 15 A m$^{-2}$.

Effects of Buffer and HRT:

Buffer concentration plays a major role in facilitating proton transport from anode to cathode in an MFC, greatly affecting the internal resistance, and thus the performance of an MFC. The production of $CO_2$ in an MFC may increase the concentration of bicarbonate, another effective proton carrier, thus lowering the internal resistance and enhancing the power density. As demonstrated by Table 1, the power density of the MFC with 50 mM phosphate buffer increased 5% to 3.40 W m$^{-2}$ when the acetate concentration increased from 100 mM to 150 mM at HRT of 1.22 hours-1.28 hours. It further increased 9% to 3.70 W m$^{-2}$ (13 A m$^{-2}$) when HRT increased from 1.22 hours to 3.00 hours with acetate concentration of 150 mM. Such a power density is about 3 times that produced in the small MFC with 50 mM phosphate buffer and 30 mM acetate. The power density increased to 11% with the increase of buffer concentration from 50 to 100 mM. Further increasing the phosphate concentration to 200 mM only resulted in a 5% increase to a maximum of 4.32 W m$^{-2}$. The increase in power density was much smaller compared with the 45% and 11% observed in the small CEAMFC when the buffer concentration was increased from 50 to 100 and 200 mM, respectively. Without being limited to a particular theory, it is currently believed that these results suggest the role of self-produced bicarbonate in reducing the internal resistance and enhancing the power generation. Although the contribution of self-produced bicarbonate might be negligible at low acetate concentrations and short HRTs, the contribution can be greatly enhanced by manipulating operating conditions, such as increased acetate concentrations, longer hydraulic retention times, and combinations thereof. The accumulation of self-produced bicarbonate at higher influent acetate concentrations and a longer HRT also resulted in elevated effluent pH possibly due to the release of $CO_2$ at elevated bicarbonate concentration.

TABLE 1

Effects of phosphate buffer, acetate concentration and HRT of effluent pH, internal resistance and maximum power density based on a large-scale MFC and a small-scale MFC

|  | Phosphate Buffer (mM) | Acetate Concentration (mM) | HRT (h) | pH | Specific internal resistance (Ohm cm$^2$) | Max. power density (W m$^{-2}$) |
|---|---|---|---|---|---|---|
| Large MFC | 50 | 100 | 1.28 | 6.78 | 234 | 3.25 |
|  | 50 | 150 | 1.22 | 7.09 | 230 | 3.40 |
|  | 50 | 150 | 3.00 | 7.39 | 208 | 3.70 |
|  | 100 | 100 | 1.44 | 6.90 | 187 | 4.12 |
|  | 200 | 100 | 1.20 | 6.68 | 174 | 4.32 |
| Small MFC | 50 | 30 | 0.1 | 6.80 | 480 | 1.25 |

Scale-up is necessary for commercial applications using MFC technology, especially for wastewater treatment. Traditionally, the scale-up of MFCs often leads to significant reduction in power density. However, as disclosed herein, the maximum power density of a CEA-MFC increased from 1.8 to 4.3 W m$^{-2}$ despite the increase in electrode area by a factor of fourteen (Table 2). Such a power density is about 1 order of magnitude higher in comparison with liter-scale MFCs (Table 2). The specific cathode area (667 m$^2$ m$^{-3}$) of the CEA-MFC is also much higher than those (100 m$^2$ m$^{-3}$ or less) of the liter-scale MFCs (Table 2). The higher power density based on the cathode area and higher cathode specific area of the CEA-MFC resulted in a 2-4 orders of magnitude higher volumetric power density (Table 2). Although the volume (30 ml) of the MFC in the particular embodiment disclosed herein is 2-3 orders of magnitude smaller than the liter-scale MFCs in many other studies, it produced a comparable or even a higher total power output of 62.3 mW (Table 2). The total power and power density can be increased to about 86 mW and 2.87 kW m$^{-3}$, respectively, provided that CEA2 produces the same power as CEA1. Moreover, the CE of the CEA-MFC in this study is also considerably higher than the liter-scale MFCs.

The U-shaped titanium wires used as current collectors in the larger CEA-MFC created about 4 times larger contact area per electrode area than in the smaller CEA-MFC and might contribute to the reduction in internal resistance, thus improving performance in particular disclosed embodiments. Other factors that might also contribute to the improved performance include using thin and high-flux separator material, the development of oxygen tolerant anodic biofilm, and the enhanced self-production of bicarbonate buffer.

TABLE 2

Performance of microbial fuel cell in comparison with liter-scale cathode MFCs

| MFC type | Anode material | Cathode material | Separator material | Volume (L) | Specific cathode area ($m^2\ m^{-3}$) | Current density at max. power density ($A\ m^{-2}$) | Current density at max. power density ($A\ m^{-3}$) | Max. Power Density ($W\ m^{-2}$) | Max. Power Density ($W\ m^{-3}$) | Max. power (mW) | CE (%) | Reference |
|---|---|---|---|---|---|---|---|---|---|---|---|---|
| Double CEA | Carbon cloth | Carbon cloth/Pt | None-woven Fabric | 0.030 | 667 | 16.4* | 7600# | 4.30* | 2080# | 62.3# | 74-98 | |
| Double CEA | Carbon cloth | Carbon cloth/Pt | J-Cloth | 0.0025 | 560 | 9.0 | 5000 | 1.80 | 1010 | 2.5 | — | |
| Tubular | Carbon veil | Carbon cloth/Pt | CMI-7000 | 1 | 43 | 0.6 | 24 | 0.13 | 5.6 | 5.6 | — | Kim et al. |
| Bipolar | Ti plate w/ MMO | Ti plate w/ MMO | Biopolar membrane | 20 | 100 | 0.3 | 30 | 0.11 | 11 | 220 | — | Dekker |
| Biocathode | Carbon felt | Carbon felt | CMI-7000 | 7.2 | 5.6 | 2 | 10 | 0.77 | 4.3 | 31 | 10-50 | Liang et al. |
| Double MEA | Carbon paper | Carbon cloth/Pt | Nafion | 1.5 | 21 | 0.3 | 5 | 0.16 | 3.5 | 5.3 | 5 | |
| Multiple electrode | GAC | Carbon cloth/Pt | NA | 20 | 0.3 | 2 | 0.5 | 0.38 | 0.2 | 3.4 | 0.04-0.3 | Jiang et al. |
| Biocathode | granular graphite | Carbon felt | CMI-7000 | 7.5 | 25 | 0.8 | 20 | 0.39 | 9.8 | 74 | ~50 | Clauwaert et al. |

*For CEA1.
For the double-CEA-MFC

Cathode Analysis

In particular disclosed embodiments, a catalyst may be used to promote increased activity of the disclosed microbial fuel cell. The following working embodiments illustrate performance enhancement of the disclosed microbial fuel cell over traditional microbial fuel cells. For example, using an activated carbon powder (PAC) as the catalyst, PTFE as binder, carbon cloth as base material, and PTFE as water-proofing coating, the cathode of the disclosed microbial fuel cell achieved similar or even better performance than a traditional platinum (Pt) cathode at a Pt loading of 0.5 mg/cm$^2$.

Example 1

Activated carbon powder and PTFE was coated on to the carbon cloth without any further heat treatment. Traditionally, heat treatments are used to accomplish this task; however, commonly used heat treatment (e.g., about 340-380° C. for 0.5-1 hours) can significantly reduce the cathode's performance.

Cathode preparation was similar to those methods known in the art; the interior side of the cathode and the catalyst layer however was prepared as indicated below. For a traditional Pt-containing cathode, a commercial Pt catalyst (20 wt % Pt/C, E-TEK) was mixed with a chemical binder (5% Nafion® solution) to form a paste (7 μl-binder/mg-Pt/C catalyst). The paste was applied to one side of the carbon cloth, and dried at room temperature for 24 hours (Nafion). The Pt content was 0.5 mg/cm$^2$.

In one embodiment, the PAC cathode was prepared using the following protocol: 1.0 g PAC (Norit GSX, steam activated, acid washed) was mixed with 5 ml ethanol and mixed for 10 minutes and then dipped in 0.2 ml 60% PTFE solution. Subsequently, the mixture was heated to about 80° C. to evaporate the ethanol and form a paste. The paste was then rolled onto the interior side of the water-proofed carbon cloth and heated at 350° C. for 0.5 hours (PTFE).

In another embodiments, the PAC cathode was prepared using a similar procedure as the other PAC cathode embodiment, expect that the cathodes were air dried at room temperature, rather than heated at 350° C. for 0.5 hours (PTFE).

Figure 10:
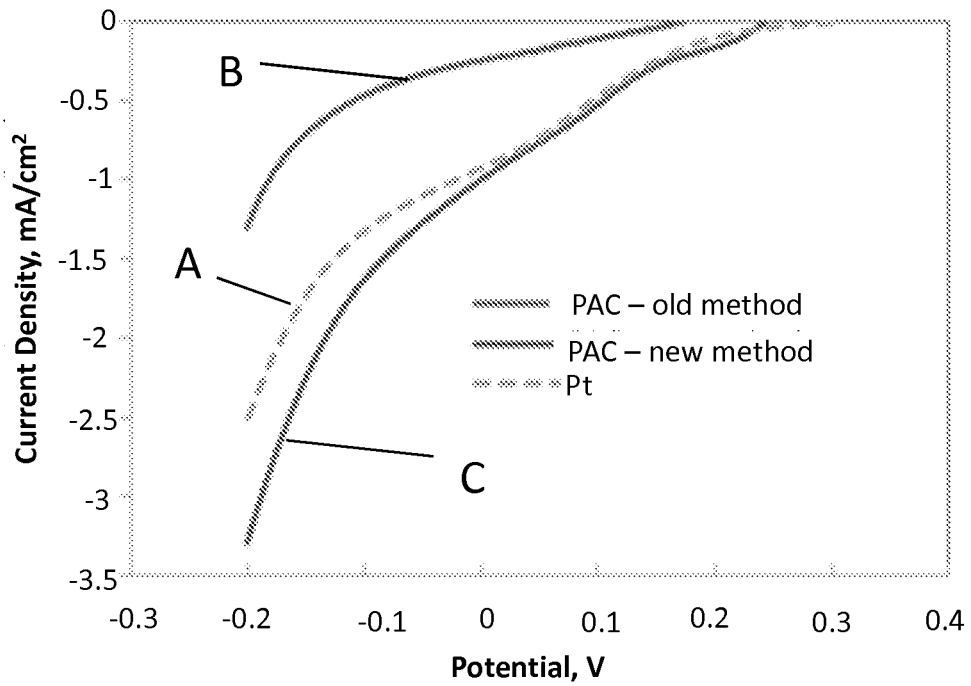
FIG. 10 is a graph illustrating linear sweep voltammetry of cathodes according to various different embodiments disclosed herein. The graph compares results obtained from embodiments concerning a traditional Pt-based cathode (A), a PAC-based cathode wherein the PAC catalyst is applied using heat (B), and a PAC-based cathode wherein no heat is used to apply the PAC catalyst (C).

The cathodes that were made without heating achieved similar or even better performance (at higher current density) than the Pt-cathode at a Pt loading of 0.5 mg/cm$^2$ (FIG. 10).

Example 2

The performance of the disclosed cathode can be further improved by adding carbon black in the catalyst layer. The cathode was prepared with the same procedure used in Example 1 except that the 1.0 g PAC was replaced by 0.9 g PAC and 0.1 g carbon black.

Figure 11:
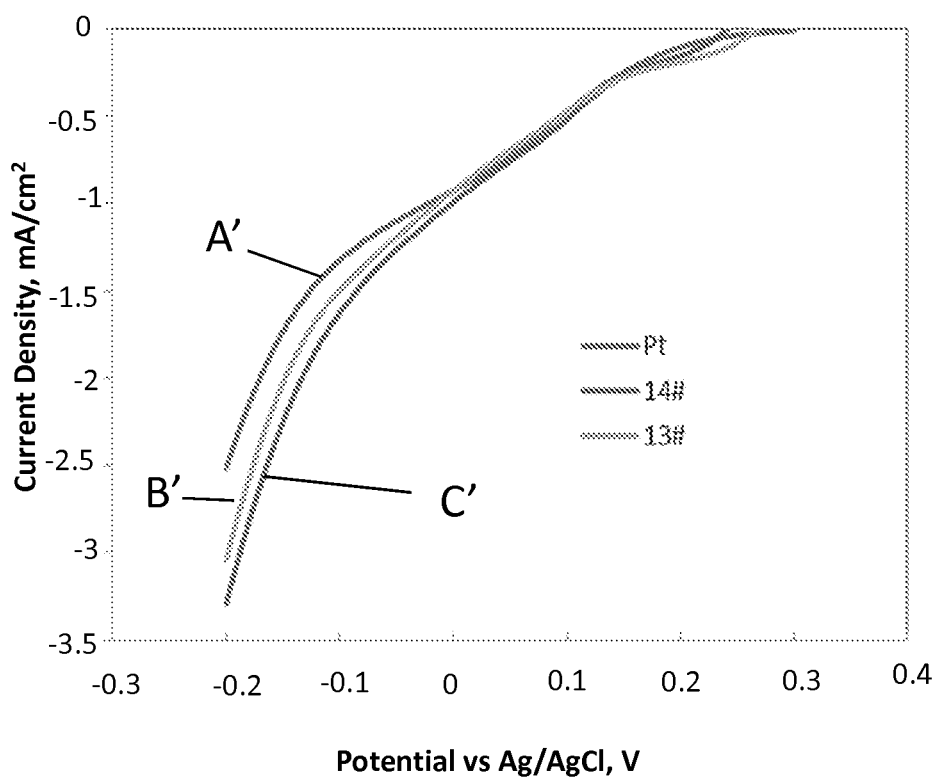
FIG. 11 is a graph illustrating linear sweep voltammetry of cathodes according to various different embodiments disclosed herein. The graph compares results obtained from embodiments concerning a traditional Pt-based cathode (A'), a cathode comprising only a PAC catalyst (B'), and a cathode comprising a mixture of PAC and carbon black (C').

PAC catalyst activity was improved by adding carbon black at current density higher than 0.5 mA/cm$^2$ (FIG. 11). Without being limited to a particular theory, it is currently believed that this improved activity results from the improved electric conductivity of carbon black over PAC, which helps reduce the ohmic loss of the cathodes.

Example 3

As disclosed herein, binding agents, or binders, often are used in preparing cathodes to form a catalyst coating on the surface of the cathode substrate, or base layer. Traditional methods use a solution of Nafion, a perfluorinated proton-exchange resin, with Pt/C powder to form a paste, which is then applied by brushing or spraying onto a carbon cloth/paper base layer. Using the Nafion solution as a binder to prepare MFC cathodes, however, is not desirable for the following reasons. First, the Nafion solution is relatively expensive, which contributes a major portion of the total cost of MFC cathodes. Second, the proton is mainly transported by anions, or pH buffer carriers, in the neutral condition of MFCs. Nafion, as a proton (cation) exchange resin, may increase the ion mass transfer resistance, or polarization resistance, of the cathode. Also, binder hydrophilicity may also affect the performance of MFCs as it is can greatly affect the mass transport of ions and gases. Increasing the hydrophilicity of traditional polystyrene-b-polyethylene oxide binders can enhance the electrochemical response of the cathode and MFC power density by ~15%, compared to a hydrophobic PS—OH binder.

Using chitosan, or a derivative thereof, as PAC catalyst binders can enhance the performance of the cathode. Chitosan is the N-deacetylated derivative of chitin, a naturally abundant mucopolysaccharide, and the supporting material of crustaceans, insects, etc. Commercially, chitosan is obtained at a relatively low cost from shells of shellfish (mainly crabs, shrimps, lobsters and krills), wastes of the seafood processing industry. Accordingly, not only is chitosan a cost-effective material, but making and using it provides an economically attractive method for disposing crustacean shell wastes.

Chitosan is selected not only for its low-cost and sustainability, but also for its potential superior performance as a PAC binder. Hydroxyl and amino groups on the backbone of chitosan affords chitosan a higher level of hydrophilicity and anion exchange capacity. As discussed herein, the hydrophilic nature of chitosan might lead to better proton transport, thus better performance as a catalyst binder.

In one embodiment, 0.3 g chitosan was dissolved in 5 ml DI water and 0.2 ml glacial acetic acid. Subsequently, 1.5 g activated carbon powder was added and well mixed to form a uniform paste. The paste was then pasted onto a waterproofed, carbon cloth base material.

Figure 12:
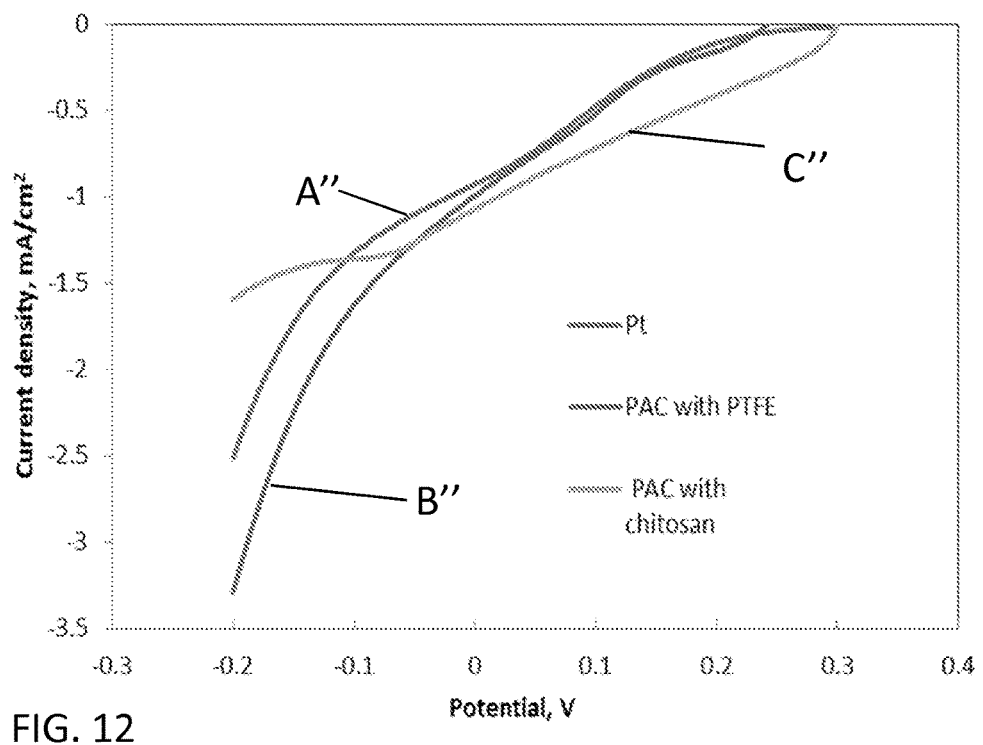
FIG. 12 is a graph illustrating linear sweep voltammetry of cathodes according to various different embodiments disclosed herein. The graph compares results obtained from embodiments concerning a traditional Pt-based cathode (A''), a PAC-based cathode using PTFE as a binder (B''), and a PAC-based cathode (C'') using chitosan as a binder.

PAC performance with chitosan as binding material demonstrated better performance than Pt (0.5 mg/cm2) and PAC with PTFE at potential higher than 0 V, where most MFCs are operated (FIG. 12).

Example 4

Design and Construction of Serially-Connected CEA-MFC

A three-chamber air-cathode MFC with a double serially connected cloth electrode assemblies (CEAs) was constructed based on the MFC previously described. To summarize, only half of the carbon cloth (CCP, fuelcellearth.com) was treated with PTFE, carbon black and Pt catalyst (20% of Pt/C catalyst; E-TEK, USA), as previously described and to be used as cathode, while the other half was untreated and was used as the anode. Non-woven fabric layers were sandwiched between the anode halves and the cathode halves of other pieces to form serially connected CEAs as illustrated in FIG. 5. Two serially connected CEAs, each with 3 individual CEAs, were placed in between three identical 1 cm thick PVC frames with 3 openings (4 cm×20 cm) to form a five-layer sandwich structure with 3 channels (4 cm×20 cm×1 cm).

CEA-MFC Operation:

The MFC was inoculated with a mixed bacterial culture from the anode of an air cathode MFC, which was originally inoculated with domestic wastewater from the Corvallis Wastewater Treatment Plant (Corvallis, Oreg.) and was operated for an extensive period of time. Acetate (100 mM) was used as the substrate, and the medium solution contained the following (per liter): $NH_4Cl$, 1.5 g; KCl, 0.13 g; $NaH_2PO_4 \cdot H_2O$, 5.84 g; $Na_2HPO_4 \cdot 7H_2O$, 15.5 g; and mineral (12.5 ml) and vitamin (12.5 ml) solutions as reported. The MFC experiments were operated at 30±2° C. in a temperature-controlled chamber.

Batch mode was initially employed and the system was switched to the continuous flow mode after two days as power output started to increase significantly. Then the CEA-MFCs were continuously fed at a flow rate of 1.0 ml/min maintained through a peristaltic pump. The medium solution in a 2,000 ml reservoir was autoclaved before being fed to the MFC at the lower end of the reactor. A portion of the effluent was recirculated back to the influent with another peristaltic pump at a flow rate of 20 ml/min to achieve more even distribution of the medium solution. A 50 ml reservoir was included in the recirculation line to collect the possible gas produced in the MFC.

Figure 13:
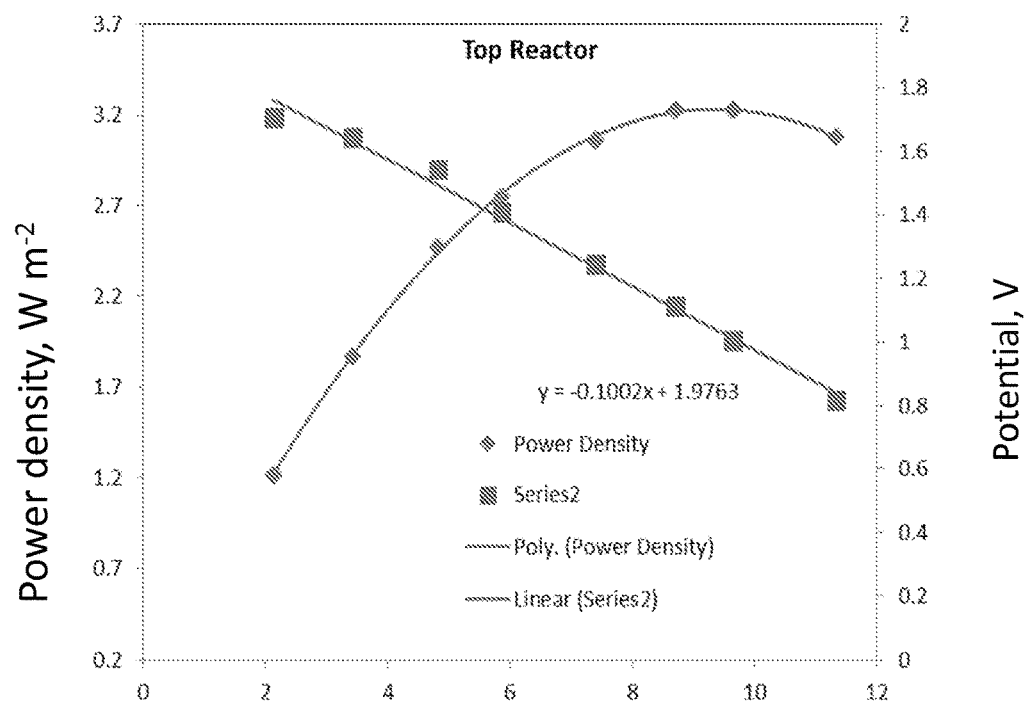
FIG. 13 is a graph illustrating polarization curves obtained from data produced by a top reactor of a serially connected set of MFCs fed with 0.1M phosphate and 0.1M acetate solutions.
Figure 14:
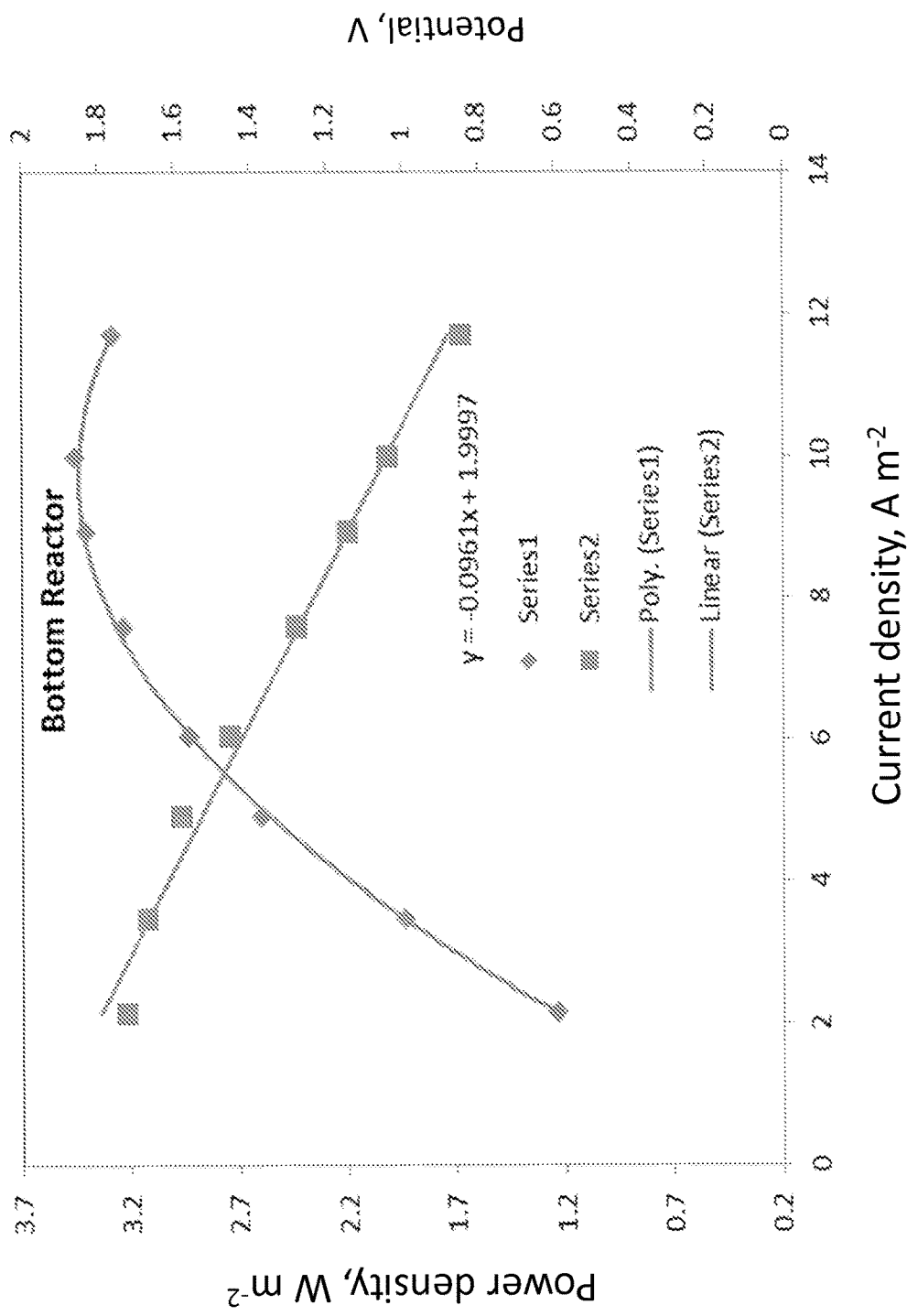
FIG. 14 is a graph illustrating polarization curves of data produced by a bottom reactor of a serially connected set of MFC fed with 0.1M phosphate and 0.1M acetate solutions.

Results:

Both top and bottoms reactors produced much higher voltage than a single MFC could produce. At a high resistance of 100 ohms, a high voltage of about 1.7 V was produced for both top and bottom reactors, with each individual CEA producing about 0.6 V. The maximum power was generated at a current density of about 10 $A/m^2$, about 3.3 $W/m^2$ for the top reactor (FIG. 13) and 3.5 $W/m^2$ for the bottom reactor (FIG. 14). The power was stable during 2 months of operation and no voltage reversal was noticed.

VI. Overview of Several Embodiments

In some embodiments disclosed herein the microbial fuel cell can comprise an anode component, a cathode component, and a separator component configured to reduce internal resistance and resist biodegradation.

In some embodiments, the separator component is a woven or non-woven fabric comprising hydrophilic fibers, hydrophobic fibers, or combinations thereof. In some embodiments, the hydrophilic fibers are selected from polypropylene, rayon, viscose, acetate, cotton, nylon, and combinations thereof. In some embodiments, the hydrophobic fibers are selected from polyester, acrylic, modacrylic, and combinations thereof. In some embodiments, the fabric comprising the hydrophobic material makes up about 1% to about 100% of the fabric. In some embodiments, the fabric comprises polypropylene. In some embodiments, the fabric comprises blended polyester and acetate, rayon, or cotton.

In any or all of the above embodiments, the separator component includes at least one opening to allow gas to pass through the separator component to reduce internal resistance.

In some embodiments, the one or more openings are linear openings, singular openings, or that intersect at one or more points, or circular openings. In some embodiments, the linear openings have a length ranging from about 0.5 cm to about 3 cm.

In any or all of the above embodiments, the separator component has a thickness ranging from about 0.01 mm to about 10 mm.

In any or all of the above embodiments, the separator component has a thickness ranging from about 0.1 mm to about 0.5 mm.

In any or all of the above embodiments, the cathode component comprises activated carbon powder.

In some embodiments, the cathode component further comprises a binder selected from a hydrophilic binder, a hydrophobic binder, and combinations thereof. In some embodiments, the hydrophilic binder comprises one or more functional groups selected from a hydroxyl group, an amino group, a thiol group, and combinations thereof, and the hydrophilic binder is a carbohydrate selected from a saccharide, a disaccharide, or a polysaccharide, a mucopolysaccharide, and combinations thereof. In some embodiments, the hydrophilic binder is selected from chitosan, a chitosan derivative, glucosamine, a glucosamine derivative, and combinations thereof. In some embodiments, the cathode component further comprises a catalyst-enhancing reagent selected to improve electric conductivity and reduce ohmic loss of the cathode component. In some embodiments, the catalyst-enhancing reagent is carbon black, graphite powder, or combinations thereof.

In any or all of the above embodiments, the cathode component comprises a gas diffusion layer.

In some embodiments, the base material is selected from carbon paper, carbon cloth, stainless steel cloth, stainless steel mesh, and combinations thereof.

In any or all of the above embodiments, the cathode component further comprises a coating material selected from polytetrafluoroethylene or polydimethylsiloxane.

In some embodiments, the catalyst and the catalytic-enhancing reagent are used in combination as a composition comprising about 50% to about 99% of the catalyst and about 1% to about 50% of the catalyst-enhancing reagent.

In any or all of the above embodiments, the microbial fuel cell further comprises one or more electrically conductive wires coupled to the anode, the cathode or both.

In any or all of the above embodiments, the microbial fuel cell further comprises one or more endplates.

In any or all of the above embodiments, the microbial fuel cell further comprises at least one inlet and at least one outlet.

Also disclosed herein are embodiments of a plurality of microbial fuel cells comprising at least one microbial fuel cells according to any or all of the embodiments above, wherein the plurality of microbial fuel cells are connected in a serial or parallel orientation.

Further disclosed is a serially connected microbial fuel cell system, comprising two or more electrically connected segments of a base material wherein at least a portion of the base material is treated with a catalyst, a binder, a catalyst-enhancing reagent, or a combination thereof; a separator component; and wherein the base material and separator components are configured to convert an organic-based fuel to energy without a current collector component or a converter component.

In some embodiments, the two or more electrically connected segments of the base material are provided by allowing physical overlap between two different segments of a base material. In some embodiments, the two or more electrically connected segments of the base material comprise different base material components. In some embodiments, a single continuous sheet of the base material is used to provide the two or more electrically connected segments of the base material and a portion of the base material acts as the anode component and a separate portion of the base material acts as the cathode component. In some embodiments, the different base material components or the single continuous sheet of the base material is carbon cloth, carbon paper, stainless steel cloth, stainless steel mesh, or combinations thereof.

Also disclosed herein is a cathode component, comprising a base material selected from carbon cloth, carbon paper, stainless steel cloth, stainless steel mesh, or combinations thereof; a coating; a catalyst; and a binder as described in any or all of the above embodiments.

In some embodiments, the cathode component comprises the catalyst-enhancing reagent of any or all of the embodiments disclosed herein. In some embodiments, the coating is polytetrafluoroethylene or polydimethylsiloxane. In some embodiments, the catalyst is activated carbon powder. In some embodiments, the base material is coated with the coating material. In some embodiments, the catalyst and the binder are applied as a layer over the base material coated with the coating material. In some embodiments, the catalyst is pre-treated with phosphoric acid or nitric acid. In some embodiments, the catalyst is treated with $FeCl_3$, $CoCl_2$, EDTA, EDA, cyanamide, or combinations thereof. In some embodiments, the binder is functionalized. In some embodiments, the binder is functionalized with a cross-linking reagent selected from glutaraldehyde, poly(ethylene glycol), citric acid glyoxal, epichlorohydrin, and combinations thereof.

Also disclosed herein is a method for producing energy, comprising providing the microbial fuel cell of any or all embodiments described above, or the system of any or all of the embodiments described above; introducing an organic-based fuel into the microbial fuel cell or the system; and isolating energy from the organic-based fuel.

In some embodiments, the organic-based fuel is selected from wastewater, organic-containing fluid, and combinations thereof. In some embodiments, the wastewater is generated from food or beverage processing. In some embodiments, electrons and protons from the organic-based fuel are separated and isolated from the fuel and pass to an anode component and then to a cathode component of the microbial fuel cell either through a wire component or through a separator component wherein the electrons and protons recombine to form water. In some embodiments, the method is performed at atmospheric pressure. In some embodiments, wherein the method is performed under a pressure greater than atmospheric pressure to maintain any $CO_2$ generated therein in a liquid state. In some embodiments, the method further comprises monitoring the performance of the microbial fuel cell by determining the power density provided by the microbial fuel cell and improving the performance of the microbial fuel cell by adjusting one or more operational conditions. In some embodiments, adjusting one or more operational conditions comprises increasing the oxygen concentration within the microbial fuel cell by introducing air into the microbial fuel cell. In some embodiments, adjusting one or more operational conditions comprises adjusting the temperature of the microbial fuel cell. In some embodiments, adjusting the temperature comprises operating the microbial fuel cell at a temperature between about 4° C. to about 100° C. In some embodiments, adjusting the temperature comprises operating the microbial fuel cell at a temperature between about 25° C. to about 80° C. In some embodiments, adjusting one or more operational conditions comprises adjusting the pH conditions of the microbial fuel cell.

In any or all of the above described embodiments, the method is performed in batch-mode or continuous mode.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A serially connected microbial fuel cell system, comprising:
    one or more electrically connected unitary anode and cathode components, wherein each unitary anode and cathode component comprises a single base material selected from carbon cloth, carbon paper, stainless steel cloth, stainless steel mesh, or combinations thereof, wherein the single base material comprises a treated area comprising a catalyst and a coating, a binder, a catalyst-enhancing reagent, or a combination thereof that forms a cathode portion of each unitary anode and cathode component, and further comprises an area that does not comprise the coating, the catalyst, the binder, the catalyst-enhancing reagent, or the combination thereof, that forms an anode portion of each unitary anode and cathode component;
    an anode component electrically associated with the cathode portion of at least one unitary anode and cathode component, wherein the anode component is an anode portion of another unitary anode and cathode component or wherein the anode component is a separate anode component;
    a cathode component electrically associated with the anode portion of at least one unitary anode and cathode component, wherein the cathode component is a cathode portion of another unitary anode and cathode component or wherein the cathode component is a separate cathode component;
    a fabric separator component configured to reduce internal resistance and resist biodegradation;
    at least one fuel cell frame that isolates the anode portion of at least one unitary anode and cathode component from the cathode portion of at least one unitary anode and cathode component; and
    wherein the single base material and the separator component are configured to convert an organic-based fuel to energy without an internal current collector component that is separate from the one or more electrically associated unitary anode and cathode components.

2. The serially connected microbial fuel cell system according to claim 1 wherein the one or more electrically connected unitary anode and cathode components are arranged to provide physical overlap between two different segments of the base material.

3. The serially connected microbial fuel cell system according to claim 1 wherein the serially connected microbial fuel cell system comprises two or more electrically connected unitary anode and cathode components wherein the two or more electrically connected unitary anode and cathode components comprise different types of base materials.

4. The serially connected microbial fuel cell system according to claim 1 wherein the serially connected microbial fuel cell system comprises two or more electrically connected unitary anode and cathode components wherein the two or more electrically connected unitary anode and cathode components are made of the same type of base material.

5. The serially connected microbial fuel cell system according to claim 1 wherein the fabric separator component is a woven or non-woven fabric comprising hydrophilic fibers, hydrophobic fibers, or combinations thereof.

6. The serially connected microbial fuel cell system according to claim 5 wherein the hydrophilic fibers are selected from polypropylene, rayon, viscose, acetate, cotton, nylon, and combinations thereof.

7. The serially connected microbial fuel cell system according to claim 5 wherein the hydrophobic fibers are selected from polyester, acrylic, modacrylic, and combinations thereof.

8. The serially connected microbial fuel cell system according to claim 5 wherein the hydrophobic material makes up 1% to 100% of the fabric.

9. The serially connected microbial fuel cell system according to claim 1 wherein the fabric separator component comprises polypropylene.

10. The serially connected microbial fuel cell system according to claim 1 wherein the fabric separator component comprises blended polyester and acetate, rayon, or cotton.

11. The serially connected microbial fuel cell system according to claim 1 wherein the fabric separator component includes at least one opening to allow gas to pass through the separator component to reduce internal resistance.

12. The serially connected microbial fuel cell system according to claim 11 wherein the one or more openings are linear openings, singular openings, or that intersect at one or more points, or circular openings.

13. The serially connected microbial fuel cell system according to claim 12 wherein the linear openings have a length ranging from 0.5 cm to 3 cm.

14. The serially connected microbial fuel cell system according to claim 1 wherein the fabric separator component has a thickness ranging from 0.01 mm to 10 mm.

15. The serially connected microbial fuel cell system according to claim 1 wherein the fabric separator component has a thickness ranging from 0.1 mm to 0.5 mm.

16. The serially connected microbial fuel cell system according to claim 1 wherein the cathode portion acts as a gas diffusion layer.

17. The serially connected microbial fuel cell system according to claim 1 wherein the catalyst comprises activated carbon powder.

18. The serially connected microbial fuel cell system according to claim 1 wherein the binder is selected from a hydrophilic binder, a hydrophobic binder, and combinations thereof.

19. The serially connected microbial fuel cell system according to claim 18 wherein the hydrophilic binder comprises one or more functional groups selected from a hydroxyl group, an amino group, a thiol group, and combinations thereof, and the hydrophilic binder is a carbohydrate selected from a saccharide, a disaccharide, or a polysaccharide, a mucopolysaccharide, and combinations thereof.

20. The serially connected microbial fuel cell system according to claim 18 wherein the hydrophilic binder is selected from chitosan, a chitosan derivative, glucosamine, a glucosamine derivative, and combinations thereof.

21. The serially connected microbial fuel cell system according to claim 1 wherein the catalyst-enhancing reagent is selected to improve electric conductivity and reduce ohmic loss of the cathode component.

22. The serially connected microbial fuel cell system according to claim 1 wherein the catalyst-enhancing reagent is carbon black, graphite powder, or combinations thereof.

23. The serially connected microbial fuel cell system according to claim 1 wherein the catalyst and the catalytic-enhancing reagent are used in combination as a composition comprising 50% by weight to 99% by weight of the catalyst and 1% by weight to 50% by weight of the catalyst-enhancing reagent.

24. The serially connected microbial fuel cell system according to claim 1 wherein the coating is polytetrafluoroethylene or polydimethylsiloxane.

25. A method for producing energy, comprising:
provining the serially connected microbial fuel cell system of claim 1;
contacting the serially connected microbial fuel cell system with an organic-based fuel; and
isolating energy from the organic-based fuel.

26. The method according to claim 25 wherein the organic-based fuel is selected from wastewater, organic-containing fluid, and combinations thereof.

* * * * *